(12) United States Patent
Bui et al.

(10) Patent No.: US 11,594,077 B2
(45) Date of Patent: Feb. 28, 2023

(54) GENERATING MODIFIED DIGITAL IMAGES UTILIZING A DISPERSED MULTIMODAL SELECTION MODEL

(71) Applicant: Adobe Inc., San Jose, CA (US)

(72) Inventors: Trung Bui, San Jose, CA (US); Zhe Lin, Fremont, CA (US); Walter Chang, San Jose, CA (US); Nham Le, Waterloo (CA); Franck Dernoncourt, Sunnyvale, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/025,477

(22) Filed: Sep. 18, 2020

(65) Prior Publication Data

US 2021/0004576 A1 Jan. 7, 2021

Related U.S. Application Data

(63) Continuation of application No. 16/192,573, filed on Nov. 15, 2018, now Pat. No. 10,817,713.

(51) Int. Cl.
*G06V 40/20* (2022.01)
*G06N 3/04* (2023.01)
*G10L 15/26* (2006.01)
*G10L 15/25* (2013.01)

(52) U.S. Cl.
CPC .......... *G06V 40/20* (2022.01); *G06N 3/0454* (2013.01); *G10L 15/25* (2013.01); *G10L 15/26* (2013.01)

(58) Field of Classification Search
CPC ...... G06V 40/20; G06V 10/454; G06V 40/28; G06V 10/25; G06V 10/82; G06V 10/811; G06V 10/764; G06N 3/0454; G06N 3/0445; G06N 3/08; G10L 15/25; G10L 15/26;
(Continued)

(56) References Cited

U.S. PATENT DOCUMENTS

2012/0032968 A1 2/2012 Fan et al.
2017/0093640 A1 3/2017 Subramanian et al.
(Continued)

OTHER PUBLICATIONS

Kevin Clark and Christopher D. Manning in Deep Reinforcement Learning for Mention-Ranking Coreference Models, EMNLP (2016).
(Continued)

*Primary Examiner* — Marcos L Torres
(74) *Attorney, Agent, or Firm* — Keller Preece PLLC

(57) ABSTRACT

The present disclosure relates to systems, methods, and non-transitory computer readable media for generating modified digital images based on verbal and/or gesture input by utilizing a natural language processing neural network and one or more computer vision neural networks. The disclosed systems can receive verbal input together with gesture input. The disclosed systems can further utilize a natural language processing neural network to generate a verbal command based on verbal input. The disclosed systems can select a particular computer vision neural network based on the verbal input and/or the gesture input. The disclosed systems can apply the selected computer vision neural network to identify pixels within a digital image that correspond to an object indicated by the verbal input and/or gesture input. Utilizing the identified pixels, the disclosed systems can generate a modified digital image by performing one or more editing actions indicated by the verbal input and/or gesture input.

20 Claims, 24 Drawing Sheets

(58) Field of Classification Search
CPC ......... G10L 15/16; G10L 15/24; G06F 3/167; G06K 9/627; G06K 9/6293
See application file for complete search history.

(56) References Cited

U.S. PATENT DOCUMENTS

2019/0251402 A1  8/2019  Godwin, IV et al.
2020/0042168 A1  2/2020  Westerman et al.

OTHER PUBLICATIONS

Kevin Clark and Christopher D. Manning, Improving Coreference Resolution by Learning Entity-Level Distributed Representations, ACL (2016).
U.S. Appl. No. 16/192,573, filed Jun. 8, 2020, Preinterview $1^{st}$ Office Action.
U.S. Appl. No. 16/192,573, filed Sep. 8, 2020, Notice of Allowance.

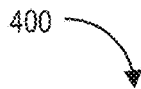

| Original parsing | After semantic mapping |
|---|---|
| remove the big crimson jackal between the cat and the tree<br>=>{<br> "noun": "jackal",<br> "properties": [ "big", "crimson"],<br> "positionship": [<br>  {<br>   "anchors": [<br>    {<br>     "noun": "cat",<br>     "positionship": [],<br>     "properties": []<br>    },<br>    {<br>     "noun": "tree",<br>     "positionship": [],<br>     "properties": []<br>    }<br>   ],<br>   "relationship": "between"<br>  }<br> ]<br>} | remove the big crimson jackal between the cat and the tree<br>=>{<br> "noun": "dog",<br> "properties": [ "big", "red"],<br> "positionship": [<br>  {<br>   "anchors": [<br>    {<br>     "noun": "cat",<br>     "positionship": [],<br>     "properties": []<br>    },<br>    {<br>     "noun": "tree",<br>     "positionship": [],<br>     "properties": []<br>    }<br>   ],<br>   "relationship": "between"<br>  }<br> ]<br>} |

*Fig. 4*

| Editing Action | Parameters | |
|---|---|---|
| Remove | Object | |
| Relocate | Object | Location |
| Change Color | Object | Color |

Fig. 5

GENERATING MODIFIED DIGITAL IMAGES UTILIZING A DISPERSED MULTIMODAL SELECTION MODEL

CROSS-REFERENCE TO RELATED APPLICATIONS

The present application is a continuation of U.S. application Ser. No. 16/192,573, filed on Nov. 15, 2018. The aforementioned application is hereby incorporated by reference in its entirety.

BACKGROUND

Advancements in software and hardware platforms have led to a variety of improvements in systems that generate and edit digital content. For example, digital content editing systems are now able to provide tools for creating and editing digital images, such as adding or removing objects portrayed in digital images, modifying colors portrayed in digital images, or correcting imperfections in digital images. Indeed, amid efforts to improve these digital content editing systems, some systems provide local editing tools to select specific objects within a digital image and then edit those objects based on user input.

Despite these advances however, conventional digital content editing systems continue to suffer from a number of disadvantages, particularly in their accuracy, efficiency, and flexibility. For example, some conventional systems utilize rule-based methods to identify and/or modify objects within digital images. However, such rule-based systems are only as accurate as their underlying rules, and, as a result, these systems often produce inaccurate results in cases where the rules do not apply to a particular image and/or object. In addition, although some conventional digital content editing systems can enable users to perform various functions based on verbal instructions, these systems nevertheless cannot handle ill-defined or otherwise generalized commands. Indeed, many of these systems require specific phrasing or exact word choice to perform corresponding commands within a digital content editing environment. As a result, these systems either inaccurately identify objects and/or commands based on more general language or fail to identify objects/commands altogether.

Moreover, many conventional systems are also inefficient. For example, many conventional digital content editing systems require a significant amount of computing resources and further require excessive user input to perform various functions. Many conventional digital content editing systems that can edit high resolution digital images require a significant amount computing power and memory to process nuanced changes to the potentially millions of pixels, especially when performed on lower-power (e.g., mobile) devices. In addition, many conventional systems require an excessive number of user inputs, user interfaces, and time to, for example, select and edit an object within a digital image. To illustrate, some conventional systems require a user to identify an object, select the object, determine which functions to perform with respect to the object, select interface elements that correspond to those functions, and manually apply the function(s) to the digital image. Thus, many of these conventional digital content editing systems are inefficient, not only in usage of computer resources, but also in management of user input and time.

In addition, some conventional digital content editing systems are inflexible. For example, many conventional systems operate using a rigidly predefined architecture. As a result, these systems cannot flexibly adapt to different computing applications and/or for operation by different types of client devices or by devices with differing capabilities. Additionally, due to the rigid architecture of many conventional digital content editing systems, these systems are not extensible and can therefore not adapt to incorporate improvements to different constituent components of the overall architecture.

Thus, there are several disadvantages with regard to conventional digital content editing systems.

SUMMARY

One or more embodiments described herein provide benefits and solve one or more of the foregoing or other problems in the art with systems, methods, and non-transitory computer readable media that create and edit digital images based on verbal (e.g., natural language) and gesture (e.g., hand, click, touch, etc.) input by utilizing one or more neural networks determined by a multimodal selection model. In particular, the disclosed systems can combine a natural language processing neural network with one or more computer vision neural networks to quickly select or change an area of a digital image based on verbal and/or gesture input. As an example, the disclosed systems can receive a verbally spoken input and can further receive a gesture input in relation to a digital image. Based on the verbal input and the gesture input, the disclosed systems can implement a multimodal selection model to determine, from among a plurality of computer vision neural networks, which neural networks to utilize in performing a verbal command of the verbal input and generating a modified digital image.

In addition, the disclosed systems can also flexibly deploy components to operate across computing devices of different capabilities and integrate with different implementing applications. For example, in one or more embodiments, the disclosed systems utilize a multimodal selection model that is implemented in isolation (e.g., separately from) image editing applications, and can thus serve multiple different applications without having to reimplement into core application logic. Similarly, the disclosed system can be implemented locally (e.g., on a client device), on the cloud, or in a hybrid configuration. Specifically, in one or more embodiments, the disclosed system determines the capabilities of a client device and generates a configuration file based on the device capabilities to install some components of the overall system to the client device for local implementation, while other components remain remote (e.g., cloud-based). Thus, the systems can provide the same experience across platforms and applications in a flexible and extensible fashion that is capable of implementing improved components as they are developed.

Additional features and advantages of the present application will be set forth in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which:

FIG. 4 illustrates an example semantic mapping based on verbal input in accordance with one or more embodiments;

FIG. 5 illustrates an example table for determining verbal commands in accordance with one or more embodiments;

DETAILED DESCRIPTION

Figure 1:
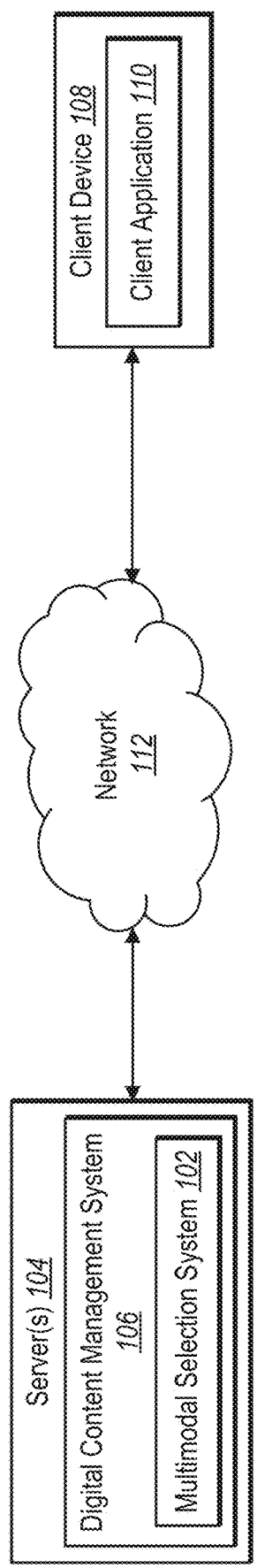
FIG. 1 illustrates an example environment for implementing a multimodal selection system in accordance with one or more embodiments.

One or more embodiments described herein provide benefits and solve one or more of the foregoing or other problems in the art with a multimodal selection system that utilizes one or more neural networks to select and edit objects within a digital image based on verbal and gesture input. In particular, the multimodal selection system can implement a natural language processing deep learning model to determine user intent, select and apply computer vision neural networks to understand and analyze objects in a digital image, apply a digital image editor to generate modified digital images, and utilize a dialog manager to obtain clarification input, as needed. Specifically, in one or more embodiments, the multimodal selection system utilizes an end-to-end natural language processing neural network to map user commands to intent and semantic slots and applies a slot-filling dialog manager to ask for missing values. The multimodal selection system can also selectively apply a variety of different computer vision neural networks to identify binary masks of requested objects based on different types of input. Furthermore, the multimodal selection system can utilize a unique architecture that interacts smoothly with different applications, dynamically deploys to devices with different processing capabilities, and provides extensibility as system components are modified.

To illustrate, the multimodal selection system can identify verbal input and gesture input corresponding to a digital image. The multimodal selection system can utilize a natural language processing neural network to determine a verbal command based on the verbal input, where the verbal command includes a verbal object class and a verbal intention. Additionally, the multimodal selection system can select a verbal and gesture neural network from a plurality of computer vision neural networks. Accordingly, the multimodal selection system can apply the verbal and gesture neural network to identify pixels corresponding to an object portrayed in the digital image that corresponds to the verbal object class. The multimodal selection system can further utilize the identified pixels and the verbal intention to generate a modified digital image portraying the object modified according to the verbal intention.

As just mentioned, the multimodal selection system can receive verbal input and/or gesture input in relation to a digital image. Particularly, the multimodal selection system can receive verbal input in the form of words spoken by a user. The multimodal selection system can also (or alternatively) receive gesture input in the form of a mouse input, a touch input, or a hand motion input. The multimodal selection system can interpret various inputs together to accurately perform commands and generate a modified digital image.

With regard to verbal input, the multimodal selection system can utilize a natural language processing neural network to determine a verbal command that includes a verbal object and a verbal intention. For example, the multimodal selection system can utilize a natural language processing neural network that includes a long short-term memory ("LSTM") network and a conditional random field ("CRF") network. Specifically, the multimodal selection system can utilize an LSTM and CRF to map user commands to intent and semantic slots of a table. The multimodal selection system can then analyze slots in the table to generate a modified digital image and/or determine if clarification input is needed.

Additionally, the multimodal selection system can implement a coreference model as part of (or independently from) the natural language processing neural network. By utilizing the coreference model, the multimodal selection system can resolve pronouns mentioned from previous comments and interpret other imprecise or general phrasing of verbal input. For example, given verbal input of "Remove it," the multimodal selection system can determine, based on the context of other received verbal input, that "it" refers to a particular object identified based on a previous user statement or selection.

In addition, as mentioned above, the multimodal selection system can selectively apply a plurality of computer vision neural networks to identify objects portrayed in digital images based on detected input. More specifically, the multimodal selection system can select one or more of a salient object neural network, a gesture neural network, or a verbal and gesture neural network to analyze and modify a digital image. For instance, based on receiving both verbal input and gesture input, the multimodal selection system can utilize a verbal and gesture neural network to identify a binary mask of an object portrayed in the digital image. Similarly, based on receiving only gesture input, the multimodal selection system can utilize a gesture neural network to identify an object within the digital image corresponding to the gesture input.

As mentioned, the multimodal selection system can generate a modified digital image based on verbal input and/or gesture input. For example, upon identifying an object (e.g., using one or more computer vision neural networks) and an intent (e.g., using natural language processing neural network), the multimodal selection system can generate a modified digital image reflecting the object and the intent. For instance, the multimodal selection system can provide an object mask and an editing command to one or more image editing applications to generate a modified image. Indeed, in one or more embodiments, the multimodal selection system is platform agnostic, and can be implemented in conjunction with a variety of different image editing applications (without modifying underlying application code).

As also mentioned, the multimodal selection system can flexibly deploy different components in different configurations across different devices. For instance, the multimodal selection system generate a configuration file based on processing capabilities of a client device. In particular, the multimodal selection system can analyze the processing capabilities of a client device by, for example, determining a processing speed, an amount of memory, a memory speed, a storage capacity, etc., of the client device. Based on the processing capability of the client device, the multimodal selection system can generate a configuration file that instructs the client device to install one or more of the neural networks or other components of the multimodal selection system onto the client device, while leaving other components for implementation on remote servers. For example, for a device with higher processing capabilities the multimodal selection system can generate a configuration file that instructs the device to install more of the components onto the device itself for more local operation.

The multimodal selection system provides several advantages over conventional systems. For example, the multimodal selection system can improve accuracy over conventional digital content editing systems. Indeed, the multimodal selection system utilizes a variety of dynamic neural networks to identify and/or modify objects in digital images based on particular user input, which provides greater accuracy over conventional rule-based systems. For instance, the multimodal selection system utilizes a natural language processing neural network and one or more computer vision neural networks to produce more accurate results across a wider range of inputs, objects, and images. In addition, by utilizing a coreference model, the multimodal selection system improves accuracy in interpreting poorly-defined, general verbal input.

In addition, the multimodal selection system improves efficiency relative to conventional systems. For example, the multimodal selection system utilizes an architecture that efficiently utilizes only available resources of computing devices. Indeed, by analyzing the processing capabilities of a client device to generate a configuration file that instructs a client device to install components of the multimodal selection system that are well-suited for the client device, the multimodal selection system more efficiently utilizes computing resources of the client device. In addition, the multimodal selection system requires fewer user inputs, user interfaces, and time than many conventional digital content editing systems. Particularly, the multimodal selection system can receive and interpret a combination of gesture input together with verbal input to determine intentions of a user to perform a particular editing command. As a result, the multimodal selection system intelligently performs user commands to edit digital images based on sparse user input relative to conventional systems that require users to manually edit digital images with nuanced object selections, editing tool applications, parameter adjustments, etc.

The multimodal selection system also improves flexibility over conventional systems. For example, the multimodal selection system can flexibly operate on a variety of client devices. Indeed, as mentioned, the multimodal selection system generates a configuration file that instructs a client device to install various components of the multimodal selection system (e.g., natural language processing neural networks, computer vision neural networks, etc.) on the client device, according to the processing capabilities of the device. In addition, the multimodal selection system can flexibly operate across different client devices in a variety of different configurations. For example, the multimodal selection system can operate with different image editing applications installed natively on a client device, as an add-on to web-based image editing applications, or in a distributed fashion for cloud-based image editing applications. Additionally still, the multimodal selection system is extensible. Thus, whereas conventional systems are fixed with a rigid architecture, the multimodal selection system can adjust to incorporate new methods, techniques, and algorithms.

As illustrated by the foregoing discussion, the present disclosure utilizes a variety of terms to describe features and benefits of the multimodal selection system. Additional detail is hereafter provided regarding the meaning of these terms as used in this disclosure. In particular, the term "verbal input" refers to input in the form of words (e.g., spoken and/or written words). For example, verbal input can include voice input and/or text input. Indeed, the multimodal selection system can receive verbal input as spoken voice input from a user via a microphone. Alternatively (or additionally), the multimodal selection system can receive verbal input as text input via a keyboard, touchscreen, or other typing interface.

Similarly, the term "gesture input" refers to input corresponding to movement of an input device or physical actions of a user detected by an input device (e.g., input that is not verbal input). For example, gesture input can refer to motion-related input such as an interaction with a touchscreen (e.g., via a hand, finger, stylus, etc.) such as a touch, tap, swipe, or press event indicating a position of an object in a digital image. Additionally (or alternatively), gesture input can refer to a mouse input (e.g., a click, swipe, drag, release, or placement) or a hand motion (e.g., gesticulation) relative to a motion sensor or input camera. In some embodiments, gesture input indicates a particular location within a digital image.

As mentioned, the multimodal selection system can utilize different neural networks to perform various natural language processing and digital image analysis functions. As used herein, the term "neural network" refers to a trainable computer-based algorithm that analyzes data (e.g., verbal input, gesture input, or a digital image) to make predictions. A neural network can refer to a tunable model that is trained to make predictions based on training data. In particular, a neural network includes a computer-implemented algorithm that analyzes input (e.g., training input) to make predictions and that improves in accuracy by comparing generated predictions against ground truth data and modifying internal parameters for subsequent predictions. In some embodiments, a neural network can employ supervised learning, while in other embodiments a neural network can employ unsupervised learning or reinforced learning. In the same or other embodiments, a neural network can be a convolutional neural network such as a region-proposed convolutional neural network. Example neural networks include a natural language processing neural network or one or more computer vision neural networks including a salient object neural network, a gesture neural network, and a verbal and gesture neural network.

More specifically, a "natural language processing neural network" refers to a neural network for predicting meaning, commands, intent, and/or entities from verbal input. In particular, a natural language processing neural network can analyze verbal input to generate predicted verbal commands. A natural language processing neural network can include a long short-term memory network ("LSTM") (e.g., a deep LSTM) whereby the multimodal selection system determines verbal intentions based on verbal input. In one or more embodiments, a natural language processing neural network can include an LSTM operating in conjunction with a conditional random field network ("CRF") (e.g., a linear-chain CRF network or a general CRF network) utilized to determine entities based on verbal input.

In addition, a "salient object neural network" refers to a neural network for predicting salient objects (i.e., foreground or prominent objects) portrayed in a digital image. In particular, a salient object neural network can include a neural network trained to predict a salient object in a digital image without verbal input and/or gesture input indicating pixels, a position, or a location of the salient object in the digital image. Similarly, a "gesture neural network" refers to a neural network for predicting objects (e.g., salient objects) in a digital image based on gesture input. For example, a gesture neural network can include a neural network trained to predict pixels reflecting a salient object within a digital image based on gesture input indicating a particular location within the digital image. Moreover, a "verbal and gesture neural network" refers to a neural network for predicting objects (e.g., salient objects) in a digital image based on verbal input and gesture input. In particular, a verbal and gesture neural network includes a neural network trained to predict pixels reflecting a salient object within a digital image based on gesture input and verbal input identifying the salient object within the digital image (e.g., verbal input naming the object and gesture input identifying a position of the object).

Relatedly, the term "train" refers to utilizing information to tune or teach a neural network. The term "training" (used as an adjective or descriptor, such as "training gesture input") refers to information or data utilized to tune or teach the model. In some embodiments, the multimodal selection system trains one or more of the above-described neural networks to generate accurate predictions based on respective training data.

As noted above, the multimodal selection system can train a natural language processing neural network to determine a verbal command based on verbal input. As used herein, the term "verbal command" refers to a directive or instruction in verbal input. In particular, a verbal command includes an instruction from verbal input to perform or execute a particular function relative to one or more objects portrayed in a digital image. For example, a verbal command can include a verbal instruction to perform an image editing function relative to a particular entity, such as removing an object from a digital image or changing the color of the image.

As mentioned above, a verbal command can include one or more entities and/or intentions. As used herein, the term "verbal intention" (or simply "intention" or "intent") refers to a purpose, action, or event associated with verbal input. For example, an intention can include a function that a user desires to perform relative to a digital image. Relatedly, the term "entity" refers to a term that provides context for the intention. Thus, a verbal command as a whole can include a verbal intention and an entity, such as, for example, a command to increase the brightness (intent) of a particular object (entity) within a digital image. Indeed, an entity can include an object, a descriptor (e.g., small, large, or blue), a referential term (e.g., between or above), a verb, an image attribute (e.g., brightness, contrast, size, opacity, etc.), an amount, a quantity, a range, a percentage, a location, or an area. The term "verbal object" refers to an object indicated by verbal input. For example, an object can refer to an object portrayed within a digital image that is identified by verbal input. Example objects include, but are not limited to, a person, a furniture item, an animal, a building, a sky, a landscape, a food item, a sun, or a body of water.

As mentioned, the multimodal selection system can generate a configuration file based on processing capacity of a client device. As used herein, the term "configuration file" refers to a file utilized by a client device to download, install, access, or utilize one or more components on the client device. A configuration file can include one or more instructions or rules that dictate files to download or install on the client device from a remote server. As mentioned above, different client devices can have different configuration files, and the multimodal selection system can update configuration files based on changes to client devices and/or based on a user switching to a different client device.

As used herein, the term "processing capacity" refers to one or more computing capabilities of a client device. For example, the term "processing capacity" can include processing speed, processing power, available memory, or time to perform a task. In one or more embodiments, the multimodal selection system determines processing capacity by determining the amount of time or resources required for a computing device to perform a diagnostic benchmark test.

As also mentioned, the multimodal selection system can identify a coreference term to determine an entity that corresponds to the coreference term. A "coreference term" refers to a word that references other contextual words, actions, or events for meaning. For example, a coreference term can include a pronoun such as "it" or "she" or "them." A conference term can also include "the" or "that" which indicate an antecedent term, action, or event. A coreference term can refer to a term included in verbal input that indicates or refers to an entity indicated in previous verbal input (or in gesture input). As an example, the multimodal selection system can receive verbal input of "Remove it," where "it" refers to an object previously indicated in prior verbal input (or an objected indicated by gesture input).

Additional detail regarding the multimodal selection system will now be provided with reference to the figures. For example, FIG. 1 illustrates a schematic diagram of an example environment for implementing a multimodal selection system 102 in accordance with one or more embodiments. An overview of the multimodal selection system 102 is described in relation to FIG. 1. Thereafter, a more detailed description of the components and processes of the multimodal selection system 102 is provided in relation to the subsequent figures.

As shown in FIG. 1, the environment includes server(s) 104, a client device 108, and a network 112. Each of the components of the environment can communicate via the network 112, and the network 112 may be any suitable network over which computing devices can communicate. Example networks are discussed in more detail below in relation to FIG. 15.

As mentioned, the environment includes a client device 108. The client device 108 can be one of a variety of computing devices, including a smartphone, tablet, smart television, desktop computer, laptop computer, virtual reality device, augmented reality device, or other computing device as described in relation to FIG. 15. Although FIG. 1 illustrates a single client device 108, in some embodiments the environment can include multiple different client devices, each associated with a different user. The client device 108 can further communicate with the server(s) 104 via the network 112. For example, the client device 108 can receive user input and other activity information and provide the information pertaining to user activity (including verbal inputs, gesture inputs, and digital images) to the server(s) 104. Thus, the multimodal selection system 102 on the server(s) 104 can receive information for user input to use in generating modified digital images based on the verbal input and gesture input.

As shown, the client device 108 includes a client application 110. In particular, the client application 110 may be a web application, a native application installed on the client device 108 (e.g., a mobile application, a desktop application, etc.), or a cloud-based application where part of the functionality is performed by the server(s) 104. The client application 110 can present or display information to a user, including digital images as part of a digital content editing application. A user can interact with the client application 110 to provide user input (e.g., verbal input and gesture input) in to, for example modify a digital image. Indeed, the client application 110 can provide a digital content editing user interface including various editing tools and menus, such as options to select and modify objects and change image attributes.

As illustrated in FIG. 1, the environment includes the server(s) 104. The server(s) 104 may generate, store, receive, and transmit electronic data, such as digital object selections and parameters utilized for generating modified digital images (e.g., parameters associated with one or more neural networks). For example, the server(s) 104 may receive data from the client device 108 in the form of verbal input and gesture input. In addition, the server(s) 104 can transmit data to the client device 108 to provide a modified digital image. Furthermore, the server(s) 104 can include one or more neural networks such as a natural language processing neural network or a computer vision neural network. For example, the server(s) 104 can communicate with the client device 108 to transmit and/or receive data via the network 112. In some embodiments, the server(s) 104 comprises a content server. The server(s) 104 can also comprise an application server, a communication server, a web-hosting server, a social networking server, or a digital content management server.

As shown in FIG. 1, the server(s) 104 can also include the multimodal selection system 102 as part of a digital content management system 106. The digital content management system 106 can communicate with the client device 108 to generate, modify, and transmit digital content, such as a digital image. For example, the digital content management system 106 can generate a modified digital image and transmit the digital image to one or more client devices.

Although FIG. 1 depicts the multimodal selection system 102 located on the server(s) 104, in some embodiments, the multimodal selection system 102 may be implemented by (e.g., located entirely or in part) on one or more other components of the environment. For example, the multimodal selection system 102 may be implemented by the client device 108 and/or a third-party device.

In some embodiments, though not illustrated in FIG. 1, the environment may have a different arrangement of components and/or may have a different number or set of components altogether. For example, the client device 108 may include or more neural networks such as a natural language processing neural network and/or one or more computer vision neural networks. As another example, the client device 108 may communicate directly with the multimodal selection system 102, bypassing the network 112. Additionally, the multimodal selection system 102 can include one or more databases (e.g., a digital image database, a training entity database, and/or a training object database) housed on the server(s) 104 or elsewhere in the environment. The multimodal selection system 102 can be implemented in a variety of different ways across the server(s) 104, the network 112, and the client device 108. Additional detail regarding implementing different components of the multimodal selection system 102 across devices is provided below (e.g., in relation to FIGS. 10-11C).

Figure 2:
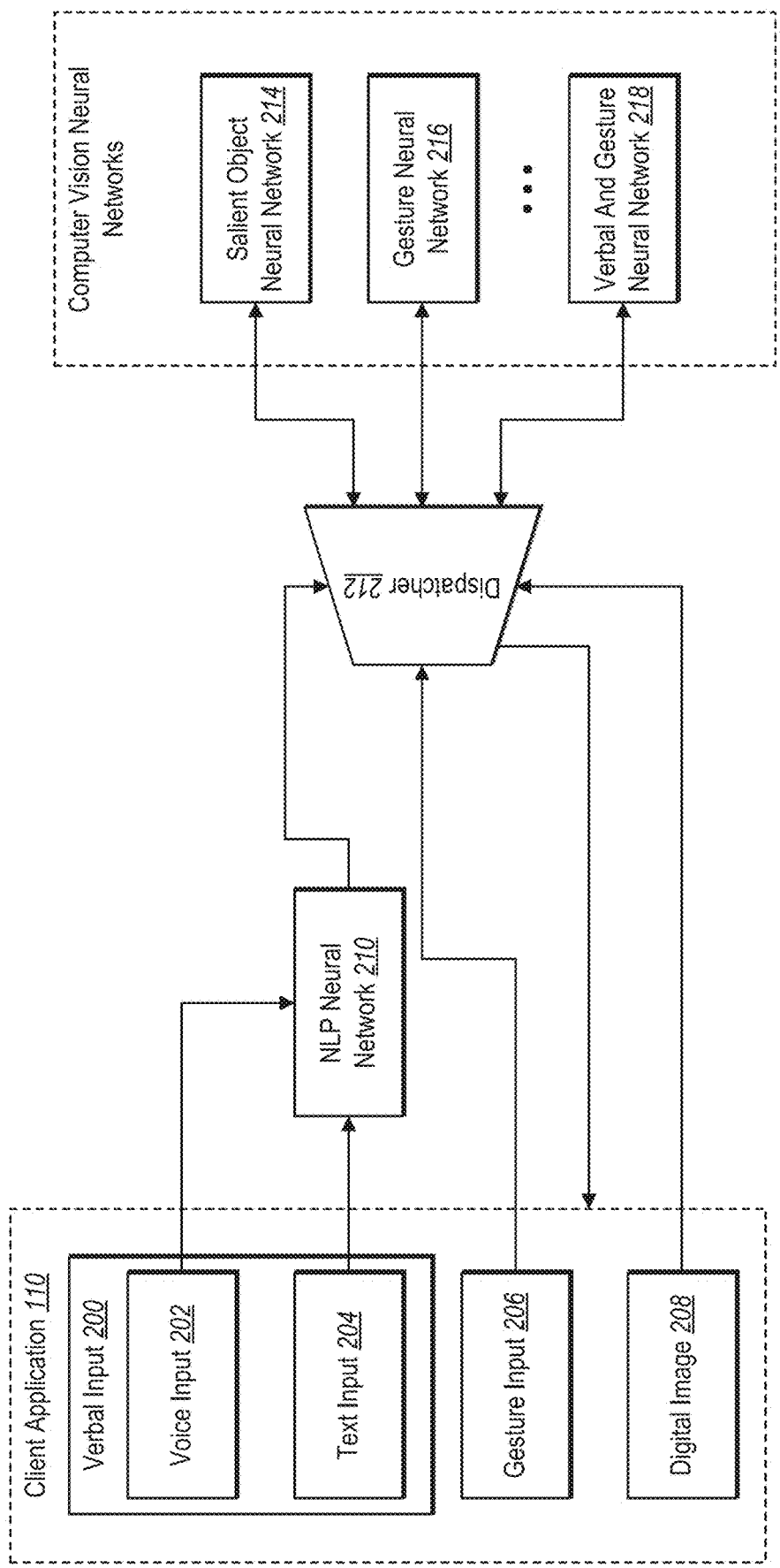
FIG. 2 illustrates an example architecture of the multimodal selection system in accordance with one or more embodiments.

As mentioned above, the multimodal selection system 102 can generate a modified digital image based on verbal and gesture input by utilizing one or more neural networks. FIG. 2 illustrates an example architecture of the multimodal selection system 102 for generating a modified digital image in accordance with one or more embodiments.

As illustrated in FIG. 2, the client application 110 can include one or more elements for providing various inputs to the multimodal selection system 102. Indeed, the multimodal selection system 102 communicates with the client application 110 to receive verbal input 200, gesture input 206, and/or a digital image 208. Based on the various inputs, the multimodal selection system 102 generates a modified digital image (e.g., modified from the digital image 208) utilizing the components illustrated in FIG. 2.

As shown in FIG. 2, the multimodal selection system 102 can include a natural language processing ("NLP") neural network 210, a dispatcher 212, and one or more computer vision neural networks 214-218. As shown, the multimodal selection system 102 can receive verbal input 200 and provide the verbal input 200 to the natural language processing neural network 210. Indeed, the natural language processing neural network 210 analyzes verbal input 200 in the form of voice (e.g., spoken) input 202 and/or text (e.g., typewritten) input 204.

Based on receiving the verbal input 200, the multimodal selection system 102 further utilizes the natural language processing neural network 210 to generate or determine a verbal command from the verbal input 200. To generate a verbal command based on the verbal input 200, the multimodal selection system 102 utilizes the natural language processing neural network 210 to perform various functions with respect to the verbal input 200. For instance, the natural language processing neural network 210 analyzes the verbal input 200 to transcribe any voice input 202 into digital text form.

In addition, the multimodal selection system 102 applies the natural language processing neural network 210 to parse the text (e.g., as transcribed from the voice input 202 or as received as text input 204) into a structured format to identify entities and/or a verbal intention from the text. Based on the structured format, the multimodal selection system 102 utilizes the natural language processing neural network 210 to map the entities and/or intention to known object classes and/or known intentions.

To perform these functions in generating a verbal command, the natural language processing neural network 210 includes one or more constituent networks such as a CRF network and an LSTM network that the natural language processing neural network 210 utilizes to generate a verbal command from the verbal input 200. Additional detail regarding the natural language processing neural network 210 and generating a verbal command is provided below with reference to FIGS. 3 and 4.

In addition to receiving and analyzing the verbal input 200, the multimodal selection system 102 can also receive other inputs. For example, as shown in FIG. 2, the multimodal selection system 102 can receive gesture input 206. To illustrate, the multimodal selection system 102 can receive a gesture input such as a touch gesture indicating the location of an object portrayed in a digital image. Specifically, the multimodal system 102 can receive a touch gesture of a single point, an area, or a boundary (e.g., a user circling an object with their finger via a touchscreen). Thus, the multimodal selection system 102 (e.g., via the dispatcher 212) cam determine locations (e.g., coordinates) of the gesture input 206 within the digital image 208 for object identification or other purposes.

As illustrated in FIG. 2, the multimodal selection system 102 can also receive a digital image 208. As described above, the digital image 208 can be captured at a client device or stored at a remote server. The multimodal selection system 102 can analyze the digital image 208 and generate a modified digital image based on the verbal input 200 and the gesture input 206.

In turn, the multimodal selection system 102 utilizes the dispatcher 212 to select one or more of the computer vision neural networks 214-218 based on the verbal input and/or the gesture input. For instance, the multimodal selection system 102 can pass the verbal command and/or verbal objects from the natural language processing neural network 210 to the dispatcher 212, whereupon the dispatcher 212 determines, in conjunction with received gesture input 206 and the received digital image 208, which of the computer vision neural networks 214-218 to apply.

For example, in cases where the multimodal selection system 102 receives gesture input 206 along with verbal input 200, the multimodal selection system 102 utilizes the dispatcher 212 to select the verbal and gesture neural network 218 to analyze the digital image 208. To illustrate, the verbal and gesture neural network 218 utilizes one or more pretrained object classes to classify objects within digital images. Thus, in analyzing the digital image 208, the verbal and gesture neural network 218 analyzes pixels (or regions) from the gesture input 206 and verbal class objects from the verbal input 200 to identify (or select) objects belonging to the pretrained object classes. More specifically, the verbal and gesture neural network 218 identifies pixels within the digital image 208 indicated by verbal input and/or gesture input to identify the most salient object corresponding to the input and classify the pixels as an object belonging to one of the pretrained object classes. In some cases, the digital image 208 may include multiple objects within the same object class. In these cases, the verbal and gesture neural network 218 identifies the most salient (e.g., the most visually significant, the largest, the closest to the foreground, etc.) of the similarly-classed objects.

As an example, the verbal and gesture neural network 218 analyzes the digital image 208 based on verbal input of "Remove this chair" in conjunction with gesture input indicating the location of the particular chair to be removed. Based on the verbal and gesture input, the verbal and gesture neural network 218 analyzes the digital image 208 to identify pixels that define a salient object at a location indicated by the input (e.g., a click at a particular location) and that corresponds to an object class indicated by the input (e.g., an object class of "chair"). Thus, by utilizing a single verbal and gesture neural network 218 that considers both verbal input and gesture input to identify relevant pixels within the digital image 208, the multimodal selection system 102 improves in accuracy relative to conventional digital image editing systems.

In some embodiments, the verbal and gesture neural network 218 fails to identify pixels within the digital image 208 corresponding to verbal input. From the previous example of "Remove this chair," in some embodiments the verbal and gesture neural network 218 determines that no pixels within the digital image 208 portray a chair (e.g., by determining that a confidence score associated with the "chair" object class is fails to satisfy a threshold). In these embodiments, the multimodal selection system 102 determines to rely instead (or more heavily) on the gesture input (e.g., the click on the particular location within the digital image 208) to indicate the object to be removed. Thus, the verbal and gesture neural network 218 can identify pixels corresponding to the object to be removed based on the gesture input. In some embodiments, based on determining that the verbal and gesture neural network 218 fails to identify pixels corresponding to verbal input, the multimodal selection system 108 instead applies the gesture neural network 216 to identify pixels within the digital image 208 based solely on the gesture input.

Similarly, in cases where the multimodal selection system 102 receives only verbal input 200 along with the digital image 208 (i.e., does not receive gesture input 206), the multimodal selection system 102 can also utilize the dispatcher 212 to select a neural network. In some circumstances, upon receiving only verbal input 200 (without gesture input 206), the multimodal selection system 102 selects the verbal and gesture neural network 218. In other embodiments, the multimodal selection system 102 selects a separate verbal neural network trained specifically to identify objects based on a verbal input (e.g., a verbal object).

Similar to the discussion above, the verbal and gesture neural network 218 identifies pixels within the digital image 208 indicated by the verbal input and, based on a set of pretrained object classes, classifies the pixels as an object belonging to one of the object classes. For example, based on verbal input of "Remove the chair," the verbal and gesture neural network 218 identifies pixels within the digital image 208 that correspond to the "chair" object class.

In still other cases where the multimodal selection system 102 receives only gesture input 206 along with the digital image 208 (i.e., does not receive verbal input 200), the multimodal selection system 102 utilizes the dispatcher to select the gesture neural network 216 to analyze the digital image 208. In particular, the gesture neural network 216 identifies pixels within the digital image 208 that correspond to a received gesture input. For example, based on a gesture input indicating a particular location within the digital image 208, the gesture neural network 216 identifies pixels that depict a salient object at the indicated location and/or within a region around the indicated location. Indeed, the gesture neural network 216 identifies pixels indicated by the gesture input as an object based on saliency (e.g., prominence, significance, or distinguishability).

In some embodiments, the multimodal selection system 102 can select and apply the salient object neural network 214. For example, in response to a command that does not identify a particular object for selection (either via gesture input or verbal input), the multimodal selection system 102 can select and apply the salient object neural network 214. To illustrate, in response to a verbal command to "lighten the background," the multimodal selection system 102 can utilize the salient object neural network 214 to differentiate salient objects from background objects. Similarly, a general command to "clean up" an image can utilize different approaches for background/foreground objects. In performing such a command, the multimodal selection system 102 can utilize the salient object neural network 214 to identify salient objects (e.g., foreground) or background (e.g., without gesture input or verbal input) and apply different modifications to "clean up" the digital image.

In other embodiments, the multimodal selection system 102 can apply the salient object neural network 214 in conjunction with other neural networks. For example, the multimodal selection system 102 can apply the salient object neural network 214 with the gesture neural network 216 and/or the verbal and gesture neural network 218. For example, the multimodal selection system 102 can utilize an object identified via the salient object neural network 214 as a filter or cross-check to objects identified via the gesture neural network 216 and/or the verbal and gesture neural network 218 (e.g., if two "hats" are identified via the verbal and gesture neural network 218, the system can utilize the hat identified via the salient object neural network 214 to make a selection between the two hats).

In addition, the multimodal selection system 102 can train each of the computer vision neural networks 214-218. For example, the multimodal selection system 102 trains the computer vision neural networks 214-218 to identify pixels for objects based on training verbal objects, training gesture input, and/or ground truth object pixels. In particular, the multimodal selection system 102 trains the verbal and gesture neural network 218 based on training verbal object classes, training gesture input, and ground truth objects. To elaborate, the multimodal selection system 102 inputs training verbal object classes and/or training gesture input into the verbal and gesture neural network 218, whereupon the verbal and gesture neural network 218 generates a predicted object by identifying pixels within the digital image 208 that correspond to the training object class and training gesture input. Specifically, the verbal and gesture neural network 218 can identify objects from a plurality of pre-determined classifications utilizing verbal object classes and gesture input (e.g., an object corresponding to a "dog" classification based on a training verbal object class of dog and a pixel or region identified in the training gesture input). The multimodal selection system 102 further compares the predicted object with a ground truth object to determine an error or measure of loss associated with the verbal and gesture neural network 218. In addition, the multimodal selection system 102 reduces or minimizes the error by modifying parameters (e.g., weights) of layers and/or neurons of the verbal and gesture neural network 218 to improve its accuracy in generating predicted objects based on verbal and gesture input.

Moreover, the multimodal selection system 102 trains the gesture neural network 216 based on training gesture input and ground truth objects. To elaborate, the multimodal selection system 102 provides training gesture input (e.g., a coordinate location, a region, or a negative location) to the gesture neural network 216. Bases on the training gesture input, the gesture neural network 216 generates predicted pixels corresponding to objects identified by the gesture input. The multimodal selection system 102 further compares the predicted object pixels with ground truth objects to determine a measure of loss. The multimodal selection system 102 further reduces or minimizes the measure of loss by modifying parameters (e.g., weights) of one or more layers or neurons of the gesture neural network 216 to improve the accuracy in generating predicted object (pixels depicting objects).

Further, the multimodal selection system 102 trains the salient object neural network 214 based on training digital images and ground truth objects. To illustrates, the multimodal selection system 102 inputs a training digital image into the salient object neural network 214, whereupon the salient object neural network 214 generates a predicted salient object by identifying pixels within the training digital image that depict the salient object. In addition, the multimodal selection system 102 compares the predicted salient object with a ground truth salient object to determine an error or measure of loss. The multimodal selection system 102 reduces or minimizes the loss by modifying parameters (e.g., weights) of one or more layers and/or neurons of the salient object neural network 214. By analyzing subsequent training digital images to generate predicted salient objects, the salient object neural network 214 improves in accuracy.

As mentioned, the multimodal selection system 102 selects a computer vision neural network to analyze the digital image 208. In addition, the multimodal selection system 102 generates a modified digital image based on the analysis of the digital image 208. For example, the multimodal selection system 102 provides pixels identified via a verbal and gesture neural network 218 to an image editing application (e.g., client application 110) to modify the digital image 208 according to a verbal command (as determined from the verbal input 200 by the natural language processing neural network 210) and gesture input 206 (as received by the dispatcher 212). Additional detail regarding generating modified digital images is provided below with reference to FIGS. 7A-9D.

As indicated by the arrow leading from the dispatcher 212 to the client application 110 in FIG. 2, the multimodal selection system 102 can communicate with the client application 110 in circumstances where additional information is required (and to provide identified pixels or object masks). For example, the multimodal selection system 102 utilizes the dispatcher 212 to engage in digital dialogue with a user to determine additional information (e.g., input) to complete a command or intention. Indeed, the multimodal selection system 102 can ask a user (via a client device) to provide clarification regarding an object, an action, or other details for modifying a digital image.

The multimodal selection system 102 can provide a dialogue request for clarification via a client device based on a number of different triggers. For instance, the multimodal selection system 102 can initiate a dialogue request for clarification based on determining that a confidence score for one or more neural networks fails to satisfy a threshold, that an entity (e.g., needed contextual information) is missing, and/or that an indicated object could not be found within the digital image 208. Thus, the dispatcher 212 provides a message to the client application 110 requesting additional information to clarify a verbal command.

Indeed, as mentioned above the multimodal selection system 102 utilizes the natural language processing neural network 200 to determine or interpret verbal commands. To illustrate, the natural language processing neural network 210 fills slots of a table based on received verbal input 200. The dispatcher 212 can initiate a digital dialogue requesting digital information based on missing slots in the table.

For example, the natural language processing neural network 200 can determine an editing action associated with a verbal command and further determine parameters associated with the editing action. Depending on the editing action, more or fewer parameters may be required to properly carry out the editing action. Indeed, an editing action to relocate an object within the digital image 208 requires parameters including such as the object to relocate and a location to place the object upon relocation. Additional detail regarding the slot-filling functionality of the dispatcher 212 is provided below with reference to FIG. 5.

Based on the verbal input and/or gesture input, the multimodal selection system 102 can generate confidence scores associated with a particular verbal command. For example, as just mentioned, the natural language processing neural network 210 determines an editing action and corresponding parameters from verbal input. As part of determining or predicting intentions, entities, or other parameters, the multimodal selection system 102 determines a confidence score (e.g., probability) corresponding for each intention, entity, or parameter. For example, the natural language processing neural network 210 can make a prediction of an intent by determining a confidence score (or probability) for a plurality of pre-determine intention classes and selecting the highest confidence score.

Similarly, the multimodal selection system 102 can generate confidence scores based on computer vision neural networks 214-218. In particular, the multimodal selection system 102 identifies probabilities associated with objects that are identified by a selected computer vision neural network. Indeed, the selected computer vision neural network determines, for each of a plurality of pretrained object classes, a probability that pixels within the digital image 208 correspond to the object class. Thus, the multimodal selection system 102 can utilize the determined probabilities as confidence scores associated with the objects.

Additionally, the multimodal selection system 102 may receive verbal input 200 that is unclear (e.g., based on confidence score that fails to satisfy a threshold) or that contains entities and/or intentions that the multimodal selection system 102 does not recognize (e.g., for which the multimodal selection system 102 has not trained the natural language processing neural network 210 and/or the computer vision neural networks 214-218). In these cases, the multimodal selection system 102 utilizes the dispatcher 212 to provide a message to the client device 110 requesting additional information relative to the digital image 208. Additional detail regarding requesting additional information from a client device via the dispatcher is provided below (e.g., in relation to FIGS. 5,6).

As another example of the dispatcher 212 providing information to the client application 110, the multimodal selection system 102 further utilizes the dispatcher 212 to provide an intention and object from the digital image 208 (e.g., an object mask) to the client application 110. For instance, the multimodal selection system 102 utilizes the dispatcher 212 to merge returned masks (e.g., digital image masks returned from the selected computer vision neural network) and/or provide returned masks to the client application 110 (e.g., together with a verbal intent to perform an operation). Additional detail regarding generating image masks is provided below with specific reference to FIG. 7B.

As indicated by the ellipsis adjacent to the computer vision neural networks 214-218, in some embodiments the multimodal selection system 102 can include additional computer vision neural networks. Indeed, as mentioned above, the multimodal selection system 102 is extensible and can assimilate additional components such as neural networks to replace or add to those already within the multimodal selection system 102. As an example, the multimodal selection system 102 can adapt to include a computer vision neural network for analyzing camera input that indicates gesticulated hand movements of a user. As another example, the multimodal selection system 102 can adapt to include a computer vision neural network specifically tuned or trained to identify a particular object (e.g., a dog) based on finer details or aspects of the particular object (e.g., dog hair).

Although not illustrated in FIG. 2, the natural language processing neural network 210 can include a coreference model. Indeed, the natural language processing neural network 210 can include a coreference model that the multimodal selection system 102 utilizes to interpret ill-defined or unclear verbal input that includes coreference terms. For example, the multimodal selection system 102 can receive verbal input that includes pronouns or other coreference terms that, without context, have little or no meaning. By utilizing the coreference model, the multimodal selection system 102 determines context for the verbal input and ascribes actionable meaning to otherwise ill-defined terms. For instance, the multimodal selection system 102 determines that "it" can refer to a verbal object mentioned in a previous verbal input.

Figure 3:
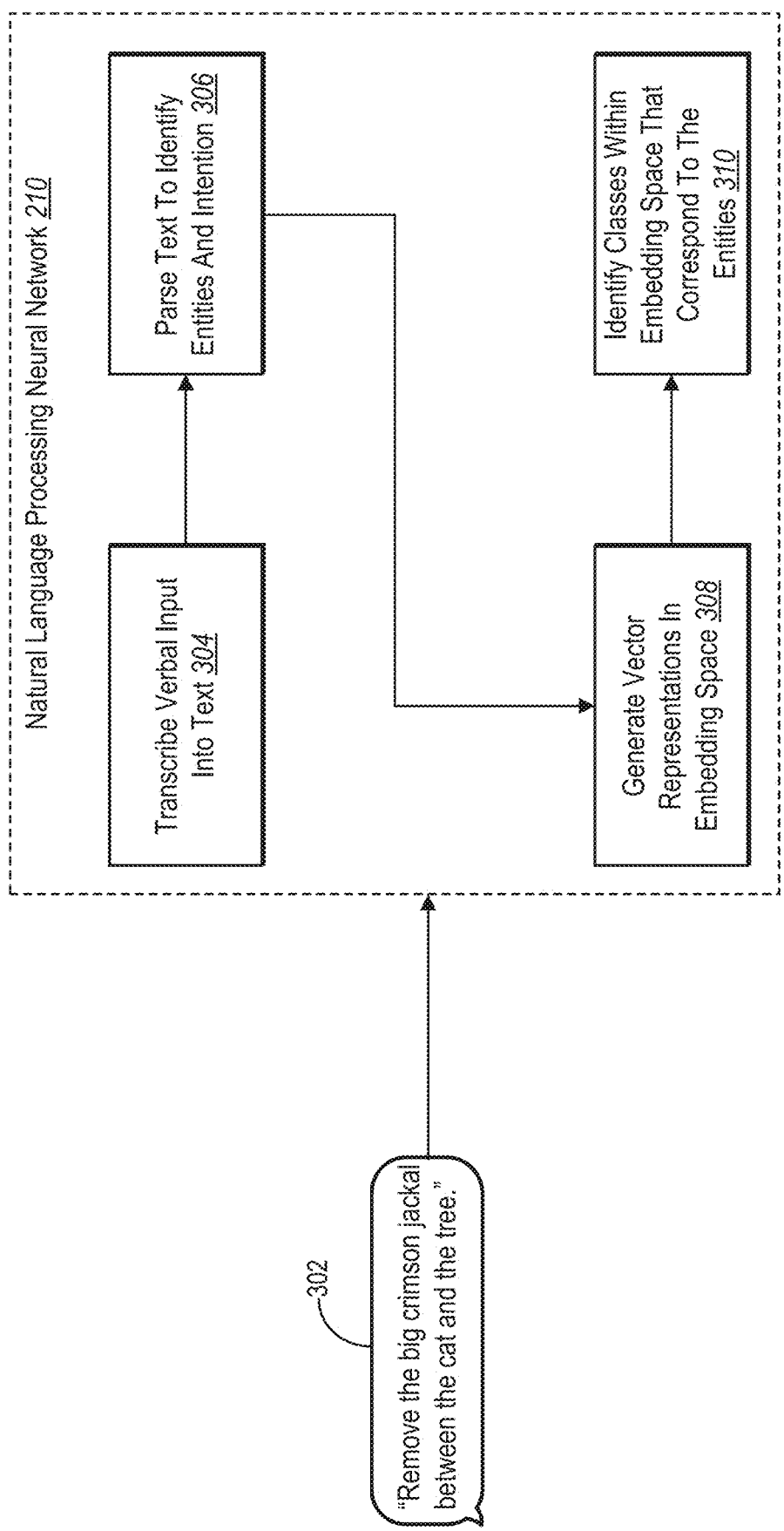
FIG. 3 illustrates an example flowchart of acts in utilizing a natural language processing neural network in relation to verbal input in accordance with one or more embodiments.

As mentioned, the multimodal selection system 102 analyzes verbal input to identify a verbal command. More specifically, as illustrated in FIG. 3, the multimodal selection system 102 utilizes a natural language processing neural network 210 to analyze verbal input 302 to generate a verbal command including one or more entities and a verbal intention. As illustrated in FIG. 3, the multimodal selection system 102 receives verbal input 302 stating, "Remove the big crimson jackal between the cat and the tree." In some embodiments, the verbal input 302 is spoken voice input, while in other embodiments the verbal input 302 is typewritten text input.

Based on the verbal input 302, the multimodal selection system 102 applies the natural language processing neural network 210 to generate a verbal command including a verbal object and a verbal intention. To generate the verbal command, the natural language processing neural network 210 performs an act 304 to transcribe the verbal input 302 into text. More particularly, the multimodal selection system 102 utilizes the natural language processing neural network 210 to, based on the audio of the verbal input 302, generate text that corresponds to the words spoken in the verbal input 302.

Indeed, the multimodal selection system 102 can utilize a speech-to-text technique to transcribe spoken verbal input into digital text. For example, the multimodal selection system 102 can utilize a speech-to-text algorithm from a particular application program interface ("API") such as GOOGLE Speech or MICROSOFT Cognitive Services. In some embodiments, the multimodal selection system 102 can train the natural language processing neural network 210 to transcribe verbal input into text. For example, the multimodal selection system 102 utilizes training data including training verbal input and corresponding ground truth text. In some embodiments, the multimodal selection system 102 trains the natural language processing neural network 210 on a word-by-word basis.

To illustrate, the multimodal selection system 102 provides a training spoken word to the natural language processing neural network 210 which the natural language processing neural network 210 analyzes to generate a predicted text word to match the training word. The multimodal selection system 102 further compares the predicted text word with a ground truth text word to determine a measure of loss. In addition, the multimodal selection system 102 adjusts or modifies parameters of the natural language processing neural network 210 to reduce or minimize the measure of loss to improve the accuracy of transcription.

Upon transcribing the verbal input into text, the multimodal selection system 102 further utilizes the natural language processing neural network 210 to perform an act 306 to parse the text to identify entities and an intention associated with the verbal input 302. To elaborate, the multimodal selection system 102 utilizes an LSTM network (e.g., as part of the natural language processing neural network 210) to identify one or more intentions from the text transcription of the verbal input 302.

To illustrate, the LSTM network encodes information from the text sequence into a fixed-length vector representation. Each verbal input includes a sequence of words, and each verbal input is also within a sequence of one or more verbal inputs. Thus, given a dialogue of verbal inputs including the verbal input 302, the LSTM network sequentially models the verbal input sentences, where latent feature vectors of previous layers (corresponding to previous words or sentences) are passed to subsequent layers, and where hidden states of sentences are obtained to generate vectors for each verbal input. The LSTM network further utilizes the vectors as features for determining verbal intentions. The LSTM network further determines relationships between verbal input and other contextual information to generate output vectors. In some embodiments, the LSTM network applies a softmax layer over output vectors to generate a final prediction or probability. Indeed, the LSTM network determines a verbal intention as the verbal intention whose label produces the highest probability.

In some embodiments, the multimodal selection system 102 trains the LSTM network. For example, the multimodal selection system 102 trains the LSTM network to determine verbal intentions based on training verbal input and ground truth verbal intentions. In training, the LSTM network learns to accurately identify intentions based on a set of ground truth intentions provided by the multimodal selection system 102, an administrative user, or from some other source. For example, the LSTM network can analyze each word in a sequence (or each sentence in a sequence of sentences), pass latent feature vectors between each sequential layer in the neural network to retain and encode contextual meaning, and to thereby generate a predicted intent. The multimodal selection system 102 further compares the predicted intent with a ground truth intent and modifies internal parameters at each sequential layer based on (e.g., to reduce) the measure of loss.

Continuing the discussion of FIG. 3, the multimodal selection system 102 further utilizes, as part of the natural language processing neural network 210, a CRF network to identify one or more entities within the transcribed text of the verbal input 302. Broadly speaking, the multimodal selection system 102 utilizes the CRF network to generate a conditional probability distribution over labels given the text transcription of the verbal input 302. More specifically, for each of a set of known entity labels (e.g., objects, actions, etc.), the multimodal selection system 102 utilizes the CRF network to generate a probability that a given word from the transcribed text corresponds to (e.g., matches) the respective entity label. To generate the probabilities, the CRF network considers various features (e.g., observable visible features and/or unobservable network features) that indicate attributes such as word identity, parts of speech, word transitions, positional information, start features, end features, and others.

The CRF network thus generates such features for each word of the text. Given the transcription of "Remove the big crimson jackal between the cat and the tree," the CRF network generates the various features and determines probabilities that words like "Remove" and "tree" correspond to relevant entity labels. Because the CRF network is conditional in nature, the multimodal selection system 102 generates tractable entity predictions based on factors such as the word sequence of the transcribed text. Thus, by utilizing the CRF network, the multimodal selection system 102 determines the parts of speech of each word of the verbal input 302, in addition to relational positionship information of each word.

As further illustrated in FIG. 3, the multimodal selection system 102 further maps the identified entities to object classes corresponding to one or more computer vision neural networks. Indeed, the object classes associated with the natural language processing neural network 210 can refer to the same objects classes that the multimodal selection system 102 uses to train the computer vision neural networks 214-218. Indeed, as mentioned above, the multimodal selection system 102 trains the computer vision neural networks 214-218 to classify objects (groups of pixels) as belonging to one a set of pretrained object classes (where the object class that returns the highest probability is the classification). In addition, the multimodal selection system 102 utilizes the natural language processing neural network 210 to map entities within verbal input to known object classes. For example, the multimodal selection system 102 utilizes the natural language processing neural network 210 to perform an act 308 to generate vector representations of identified entities within an embedding space. For example, the multimodal selection system 102 utilizes a word embedding algorithm such as Word2Vec to generate vector representations of identified entities in an embedding space.

In addition, the multimodal selection system 102 utilizes the natural language processing neural network 210 to perform an act 310 to identify classification vectors (i.e., vectors that correspond to known object classes) within the embedding space that correspond to the vectors of the entities of the verbal input 302. More specifically, the multimodal selection system 102 compares (e.g., via the dispatcher 212) the entity vectors with classification vectors (e.g., vectors of object classes known to the computer vision neural networks 214-218) to identify objects or other entities that the multimodal selection system 102 can analyze. For example, the verbal input 302 contains the word "jackal," which in some cases, is not recognizable to the computer vision neural networks 214-218. Thus, the multimodal selection system 102 identifies, within the embedding space, a classification vector that is closest to the vector corresponding to the word "jackal." Indeed, in some embodiments the multimodal selection system 102 identifies a vector corresponding to the word "dog" as the closest classification vector to the vector of the word "jackal." Thus, based on the object classes as mentioned, the multimodal selection system 102 identifies known entities from based on entities recognizable by the computer vision neural networks 214-218.

As an example of a structured format of a verbal input that the multimodal selection system 102 generates by way of the natural language processing neural network 210, FIG. 4 illustrates a semantic mapping of the verbal input 302. As shown, the table 400 includes the original parsing (e.g., resultant from act 306) of the verbal input 302 as well as the parsing after semantic mapping (e.g., resultant from act 310). Indeed, the original parsing illustrates the parts of speech identified for various words of the verbal input 302, such as "noun" corresponding to "jackal," "cat," and "tree."

As shown in the original parsing, the multimodal selection system 102 identifies properties or attributes associated with each noun. The properties of "jackal" are "big" and "crimson," whereas the properties of "cat" and "tree" are empty sets. Additionally, the multimodal selection system 102 identifies a positionship associated with the various objects such as "jackal," "cat," and "tree." As shown, the positionship of "cat" and "tree" are empty sets, whereas the positionship of "jackal" includes anchors (e.g., objects that define the positionship) in the form of the nouns "cat" and "tree." As also shown, the multimodal selection system 102 further determines or identifies a relationship of "between" that defines or clarifies the positionship.

As further shown, as a result of the semantic mapping, the multimodal selection system 102 maps entity terms (e.g., objects, attributes, etc.) to entities that are recognizable to one or more of the computer vision neural networks 214-218. For example, the multimodal selection system 102 maps the term "jackal" to "dog" and the term "crimson" to "red." Accordingly, the multimodal selection system 102 retains the properties, positionship, and relationship information from the original parsing and replaces the unknown entities ("jackal" and "crimson") with known entities ("dog" and "red").

As mentioned, the multimodal selection system 102 utilizes the natural language processing neural network 210 and/or the dispatcher 212 to slot-fill a table based on verbal input and/or gesture input. In particular, the multimodal selection system 102 fills a table according to a transcription of verbal input (or objects identified via gesture input), where the table includes a first column for an editing action and a second column for parameters associated with (e.g., that are necessary to carry out or perform) the editing action. FIG. 5 illustrates an example table 500 including different types of verbal commands that include editing actions and corresponding parameters. Although FIG. 5 illustrates particular editing actions, in some embodiments an editing action can refer to any operation or function of a client application (e.g., client application 110) for editing digital images.

FIG. 5 illustrates the table 500 including editing actions of "remove," "relocate," and "change color." Indeed, utilizing the techniques described above, the multimodal selection system 102 can utilize a natural language processing neural network 210 to determine an editing action associated with a verbal command and/or gesture input. Based on the determined editing action, the multimodal selection system 102 identifies a predefined number of parameter slots associated with the editing action that each correspond to a particular parameter for performing the indicated editing action. For example, in some embodiments the "remove" action includes only a single parameter to indicate the object to be removed. The "relocate" action includes a first parameter of an object to relocate and a second parameter of a coordinate location to place the object. Relatedly, the "change color" action includes a first parameter of an object to change and a second parameter of a new color for the object.

To fill the table 500, the multimodal selection system 102 utilizes the natural language processing neural network 210 as described above to map entities and determine intentions associated with a verbal command. As the multimodal selection system 102 identifies entities within verbal input (and/or via gesture input), the multimodal selection system 102 fills in the table 500. Thus, the multimodal selection system 102 identifies editing actions from the verbal input and/or gesture input and further determines whether the verbal input and/or gesture input includes the information to execute or perform the editing actions. In cases where the multimodal selection system 102 determines that additional slots in the table 500 are not filled (or not filled to a threshold confidence), the multimodal selection system 102 provides a message to the client application 110 requesting the additional information.

Figure 6:
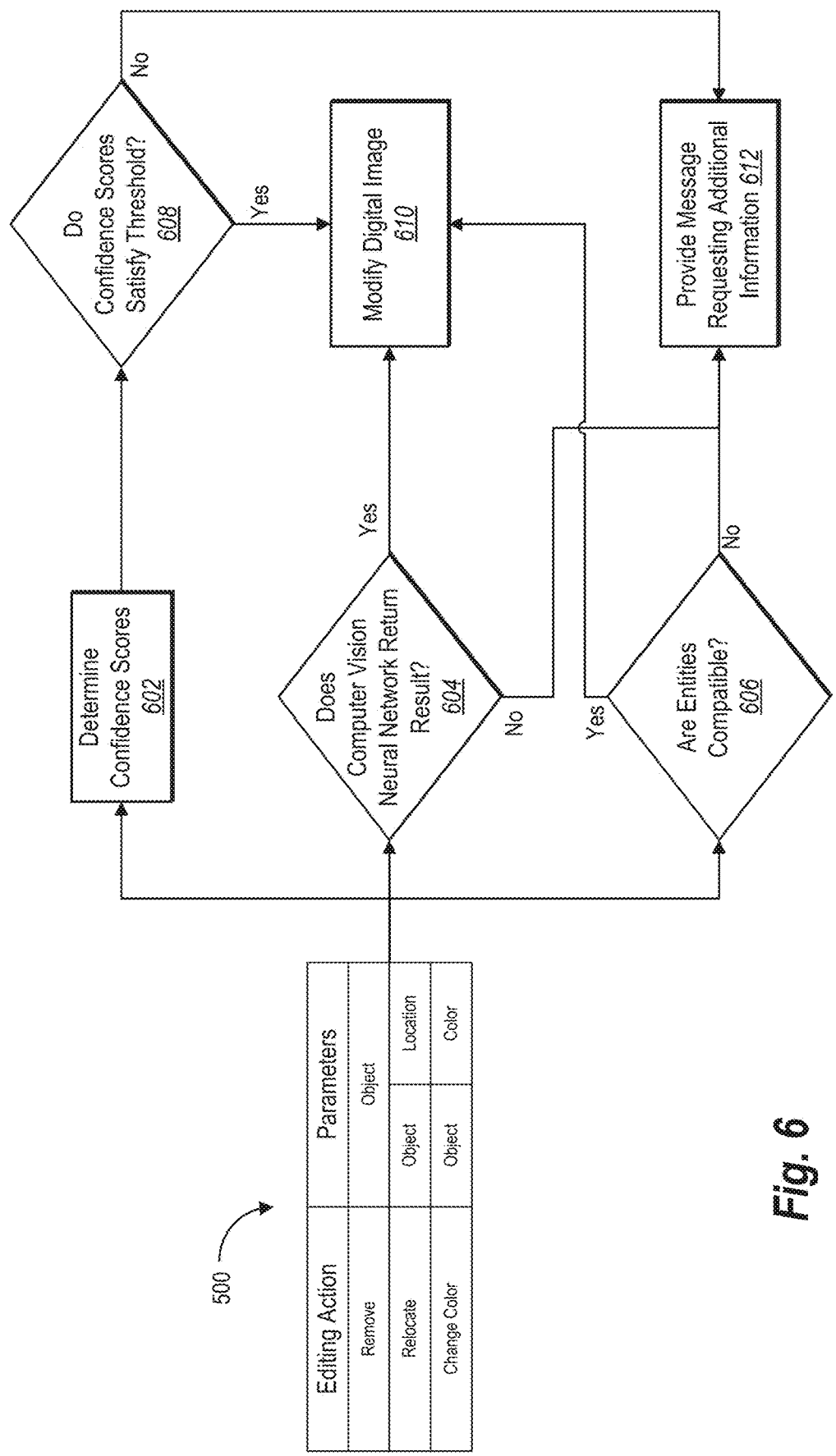
FIG. 6 illustrates an example process of determining whether additional information is required to perform a verbal command in accordance with one or more embodiments.

Indeed, FIG. 6 illustrates an example process by which the multimodal selection system 102 determines whether to request additional information in relation to a digital image. As shown, there are multiple circumstances where the multimodal selection system 102 requests additional information to clarify or add to previously-received input. More specifically, in a first circumstance, the multimodal selection system 102 performs an act 602 to determine confidence scores associated with verbal commands and/or gesture input (e.g., as indicated by the table 500).

To determine confidence scores, the multimodal selection system 102 utilizes the natural language processing neural network 210 and the computer vision neural networks 214-218 to determine probabilities of the verbal input and/or gesture input corresponding to particular editing actions and parameters. For example, as mentioned above, the multimodal selection system 102 utilizes the natural language processing neural network 210 to determine probabilities that verbal input indicates particular editing actions or other entities. In addition, the multimodal selection system 102 further utilizes a selected computer vision neural network to determine probabilities that a digital image (e.g., the digital image 208) contains objects belonging to particular verbal object classes or gesture input. In some embodiments, the multimodal selection system 102 utilizes the probabilities determined by the natural language processing neural network 210 and the computer vision neural networks 214-218 as confidence scores, while in other embodiments, the multimodal selection system 102 utilizes normalized versions of the probabilities or averages of probabilities determined by the natural language processing neural network 210 and the selected computer vision neural network.

In addition, the multimodal selection system 102 performs an act 608 to determine whether the confidence scores satisfy a threshold. If the multimodal selection system 102 determines that none of the probabilities satisfies a threshold (e.g., 50%, 80%, etc.), then the multimodal selection system 102 further performs an act 612 to provide a message to the client application 110 requesting additional information. For example, the multimodal selection system 102 provides a message requesting a repeat of the verbal input or a rephrasing of the verbal input. On the other hand, if the multimodal selection system 102 determines that a confidence score of at least one editing action and the corresponding parameters satisfies a threshold, then the multimodal selection system 102 performs an act 610 to modify the digital image (e.g., by performing the editing action according to the indicated parameters). To modify the digital image, the multimodal selection system 102 utilizes a client application 110 to perform, implement, or apply an identified editing action to the digital image according to the corresponding parameters.

In a second circumstance where the multimodal selection system 102 can provide a message requesting additional information, the multimodal selection system 102 performs an act 604 to determine whether one of the computer vision neural networks 214-218 returns a result. For example, the multimodal selection system 120 utilizes the computer vision neural networks 214-218 to perform a cursory analysis with respect to an identified object (or other parameter) and/or editing action. If the computer vision neural networks 214-218 fail to return a result (or fail to return a result that satisfies a confidence score threshold) or cannot otherwise perform the identified action or identify the corresponding parameters, then the multimodal selection system 102 performs an act 612 to provide a message requesting additional information. On the other hand, if the multimodal selection system 102 determines that the computer vision neural networks 214-218 do return a result, then the multimodal selection system 102 continues to perform an act 610 to modify the digital image.

In a third circumstance, the multimodal selection system 102 performs an act 606 to determine whether the entities of the table 500 are compatible with other components multimodal selection system 102. For example, the multimodal selection system 102 determines whether the natural language processing neural network 210 and/or the computer vision neural networks 214-218 are trained to recognize the entities within the verbal input. If the multimodal selection system 102 determines that the entities are not known (or that the verbal command is unsupported by the client application 110), then the multimodal selection system 102 performs an act 612 to provide a message requesting additional information. Alternatively, if the multimodal selection system 102 determines that the entities are known (and the verbal command is supported by the client application 110), the multimodal selection system 102 performs an act 610 to select a computer vision neural network to perform the verbal command with respect to the entities.

As mentioned, the multimodal selection system 102 generates a modified digital image based on verbal input and/or gesture input. FIGS. 7A-9D illustrate various example user interfaces associated with the client application 110, as presented on the client device 110. The following description relates to modifying digital images according to various verbal inputs and/or gesture inputs in different circumstances.

Figure 7A:
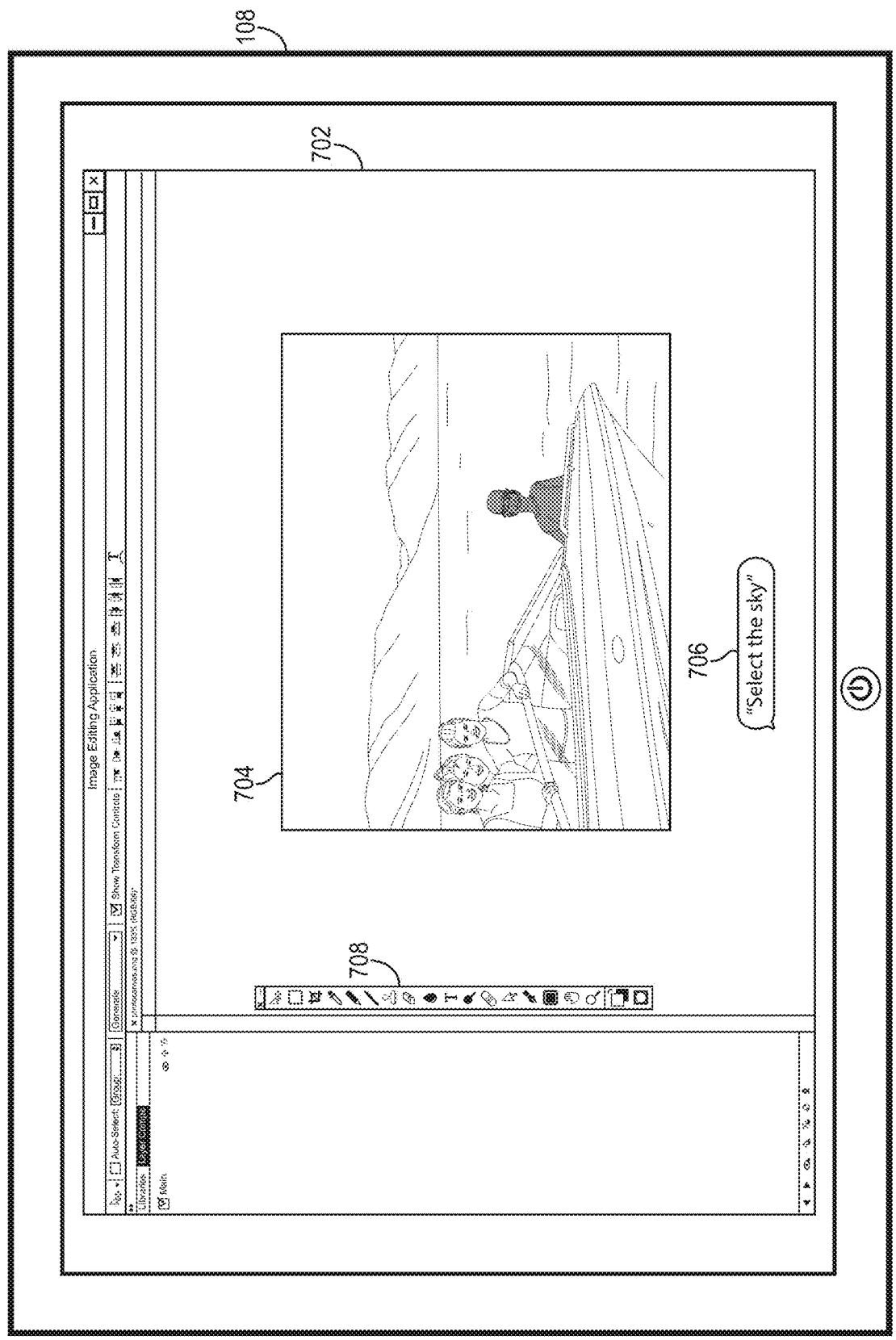
FIGS. 7A-9D illustrate example graphical user interfaces for receiving inputs and providing modifications to digital images for display in accordance with one or more embodiments.

For example, FIG. 7A illustrates the client device 108 displaying an image editing interface 702 of a client application (e.g., client application 110). The image editing interface 702 displays various elements and tools that a user can utilize to create, edit, or otherwise modify the digital image 704. For example, the image editing interface 702 includes a toolbar 708. In addition, the image editing interface 702 includes a verbal input bubble 706. Indeed, the multimodal selection system 102 receives verbal input such as "Select the sky," and presents the verbal input within the verbal input bubble 706.

Figure 7B:
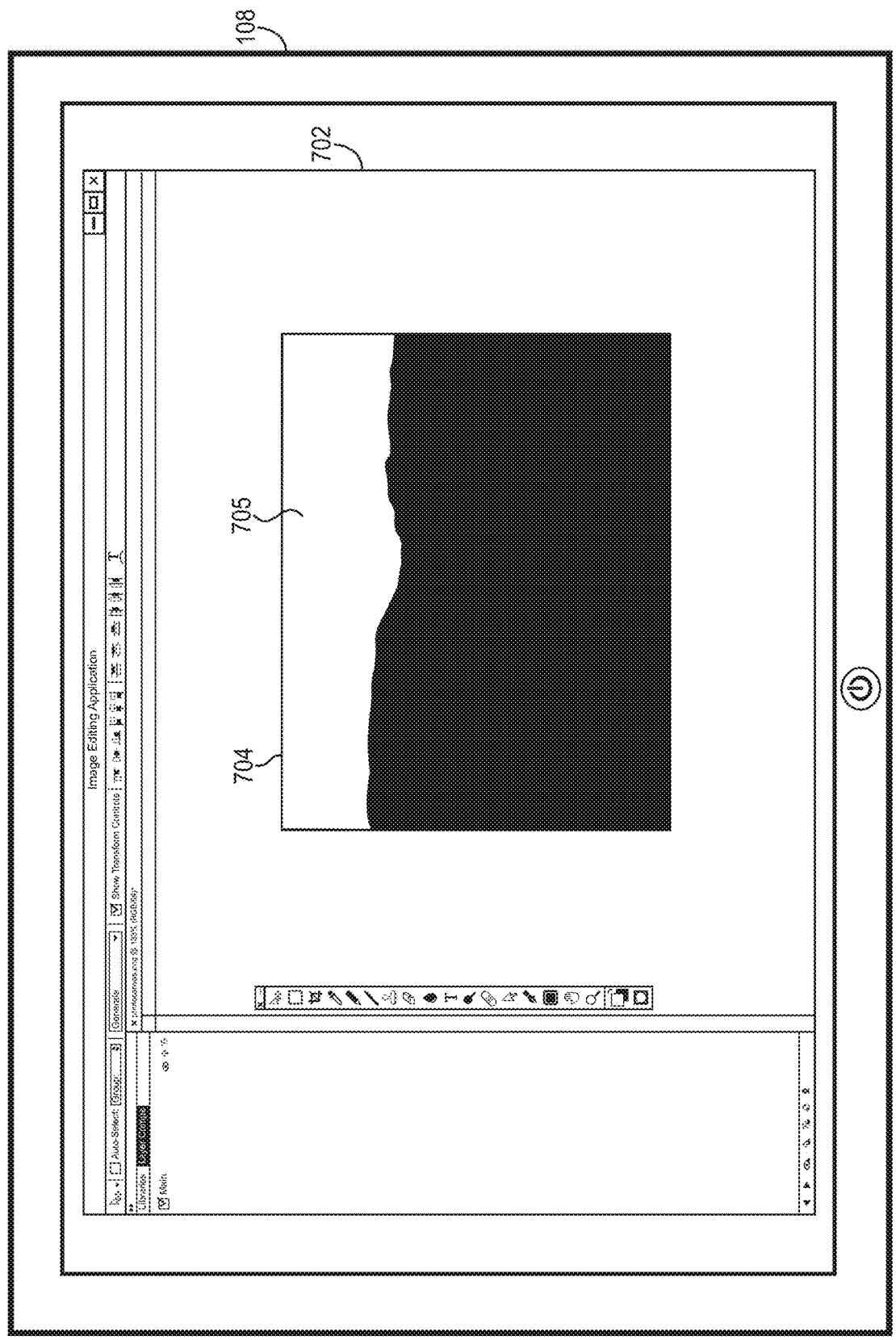

Based on the verbal input, the multimodal selection system 102 utilizes the techniques described herein to identify and select the sky within the digital image 704. More specifically, the multimodal selection system 102 utilizes the natural language processing neural network 210, the dispatcher 212, and a computer vision neural network to identify pixels within the digital image 704 that correspond to the word "sky." Indeed, FIG. 7B illustrates a binary mask of the digital image 704 that the multimodal selection system 102 generates to identify the sky 705.

To elaborate, the multimodal selection system 102 utilizes a computer vision neural network to generate a binary mask of the digital image 704, where the computer vision neural network assigns each pixel of the digital image 704 a value of 0 or 1. The multimodal selection system 102 uses the computer vision neural network to identify those pixels having a value of 1 as pixels corresponding to the "sky" and pixels having a 0 as pixels not corresponding to the "sky" (or vice-versa).

Figure 7C:
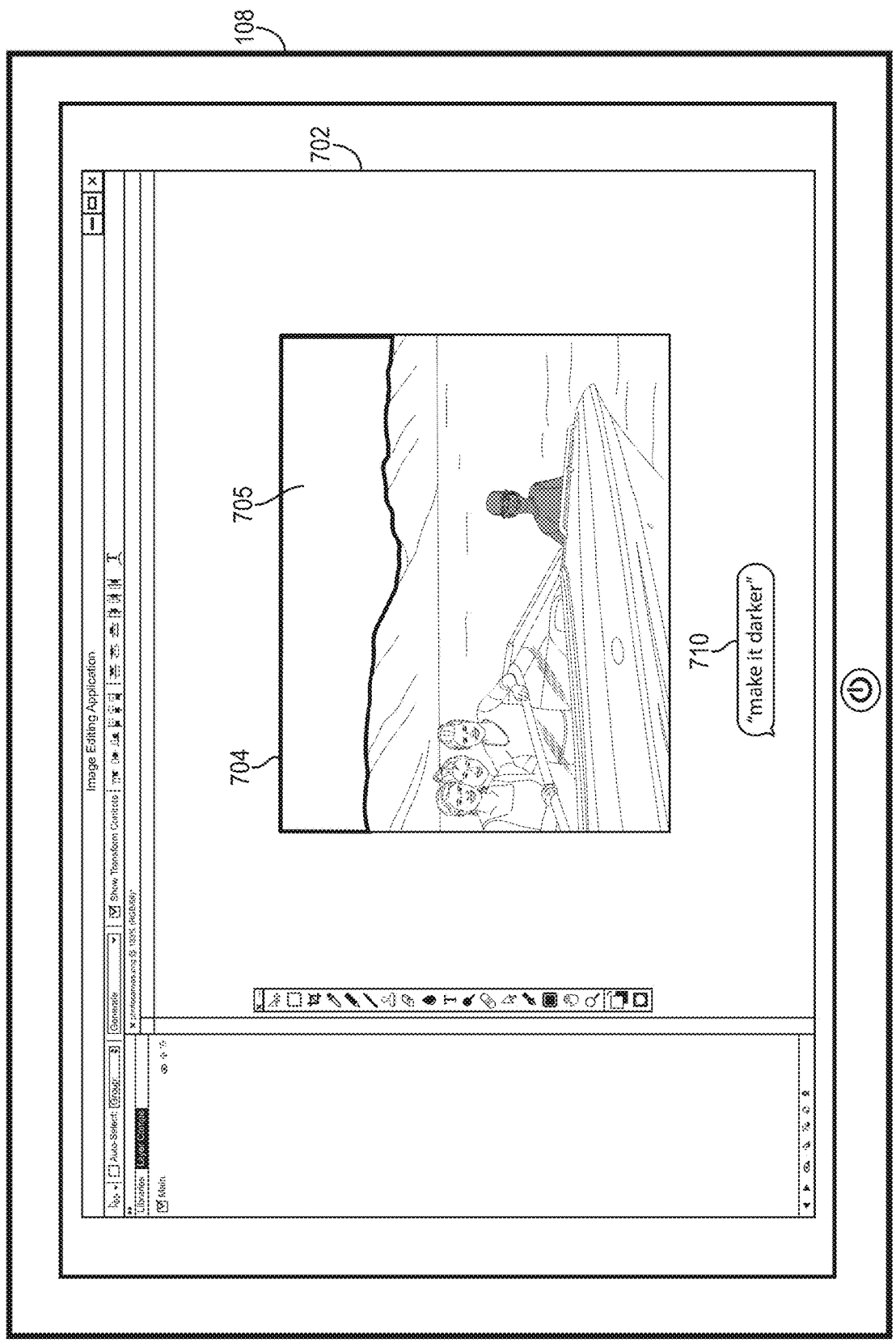

Thus, upon receiving the verbal input "Select the sky," the multimodal selection system 102 selects the sky 705 as shown by the bold outline of the sky 705 in FIG. 7C. To select the sky 705, the multimodal selection system 102 selects an appropriate computer vision neural network (e.g., the verbal and gesture neural network 218) to analyze the digital image 704.

In addition, and as further illustrated in FIG. 7C, the multimodal selection system 102 receives additional verbal input of "make it darker," as indicated by the verbal input bubble 710. Based on receiving the verbal input, the multimodal selection system 102 utilizes the natural language processing neural network 210 to interpret the verbal input. In particular, the multimodal selection system 102 utilizes a coreference model to determine the meaning of any ill-defined coreference terms within the verbal input. For example, the phrase "make it darker" includes the pronoun "it" that is a coreference term that, taken alone, is indefinite and unclear. Thus, by utilizing a coreference model (e.g., the coreference models described by Kevin Clark and Christopher D. Manning in Deep Reinforcement Learning for Mention-Ranking Coreference Models, EMNLP (2106) or Kevin Clark and Christopher D. Manning, Improving Coreference Resolution by Learning Entity-Level Distributed Representations, ACL (2016), which are incorporated by reference herein in their entirety), the multimodal selection system 102 interprets the coreference term "it" to relate to the selected sky 705. As a result, the verbal input "make it darker" refers to a verbal command to make the sky 705 darker.

Figure 7D:
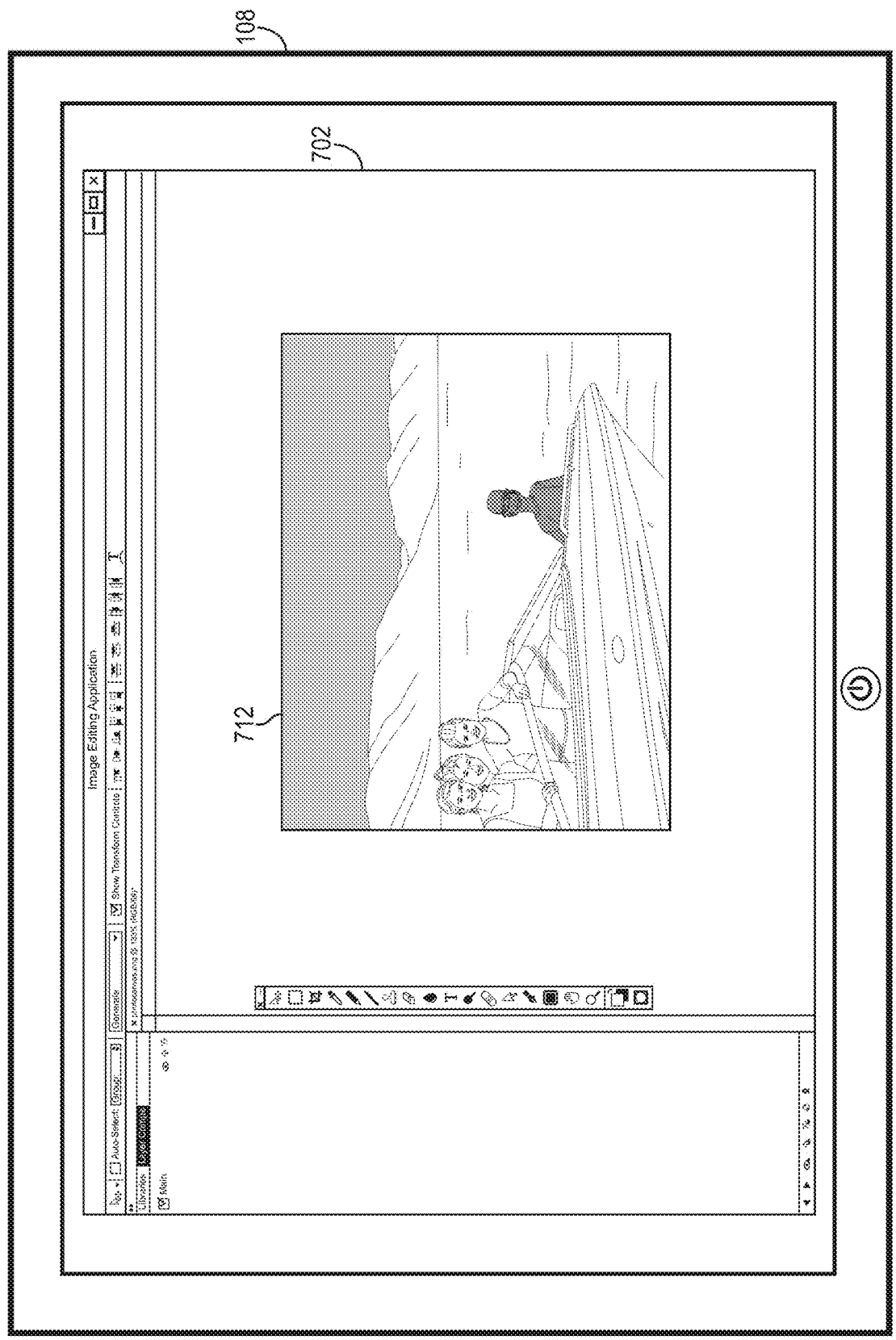

Indeed, FIG. 7D illustrates a modified digital image 712 within the image editing interface 702. As shown, the modified digital image 712 includes a darker sky than the digital image 704. To generate the modified digital image 712, the multimodal selection system 102 performs the techniques described herein to instruct the client device 108 (or some other component) to darken the sky 705. For instance, the multimodal selection system 102 determines an image editing action (to darken the sky) as described and utilizes the client device 108 to perform the editing action.

Figure 8A:
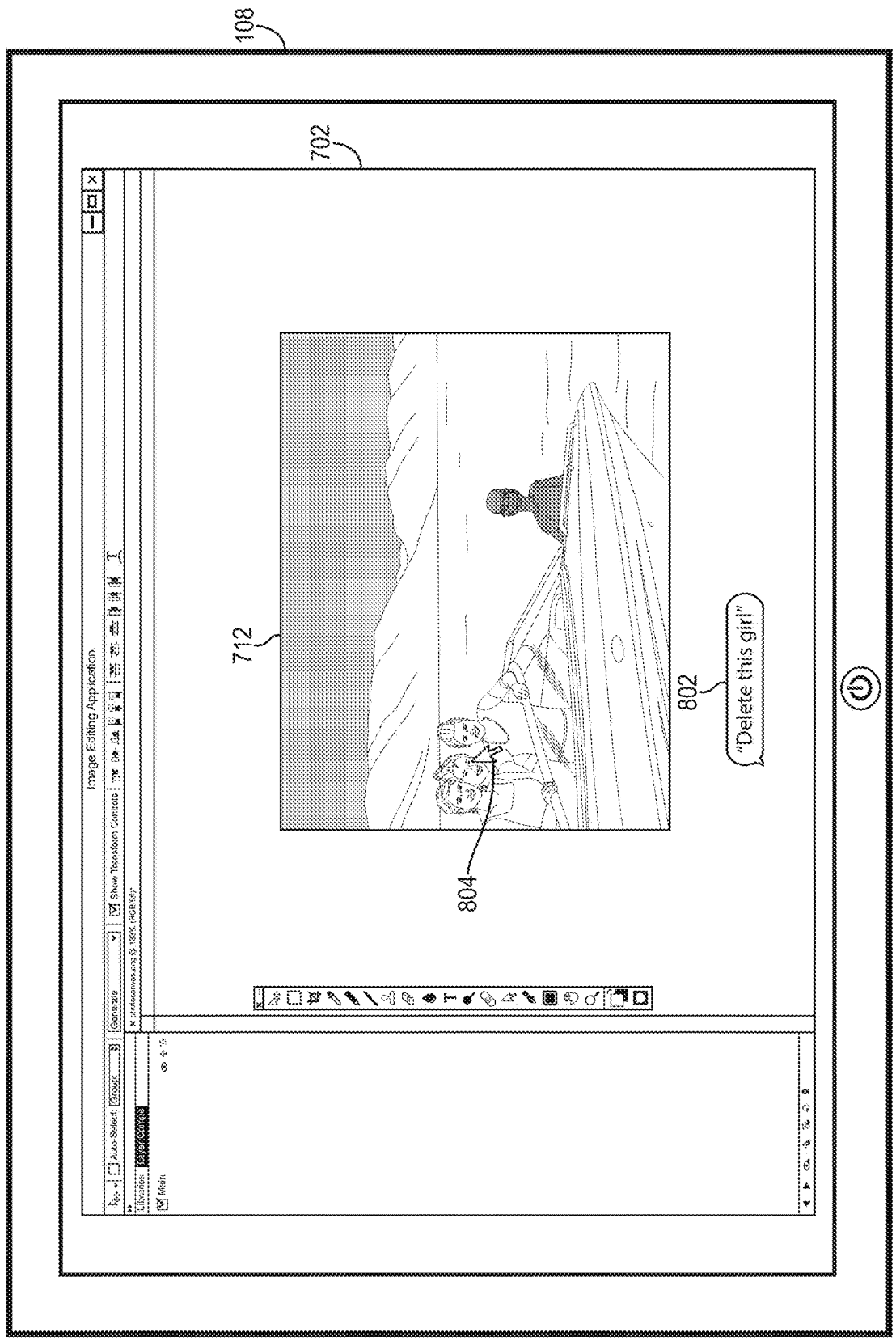

Relating to the modified digital image 712, FIG. 8A illustrates a verbal input bubble 802 indicating received verbal input of "Delete this girl." In addition, FIG. 8A illustrates a cursor 804 representing a gesture input received at a particular coordinate location within the modified digital image 712. Based on receiving verbal input together with gesture input, the multimodal selection system 102 selects the verbal and gesture neural network 218 from the plurality of computer vision neural networks to analyze the digital image 712. Thus, based on the verbal input, "Delete this girl," along with the gesture input at a coordinate location corresponding to the middle of the three girls shown in the modified digital image 712, the multimodal selection system 102 applies the verbal and gesture neural network 218 to identify pixels of the modified digital image 712 that correspond to the received verbal input and gesture input.

To illustrate, the multimodal selection system 102 utilizes the natural language processing neural network 210 to determine an intent (to delete something) and further to determine an object related to the intent (the girl). The multimodal selection system 102 further utilizes the identified intent and object, together with the gesture input indicating a location within the digital image 712, to select the verbal and gesture neural network 218. Utilizing the verbal and gesture neural network 218 based on the gesture input indicating the particular location within the digital image 712 in conjunction with the identified object "girl," the multimodal selection system 102 identifies pixels depicting the middle of the three girls as the object corresponding to the input. Thus, to modify the digital image 712, the multimodal selection system 102 provides the intent (to delete) as well as an object mask identifying the middle girl to the client application 110 to perform the editing action and generate a modified digital image as shown in FIG. 8B.

Figure 8B:
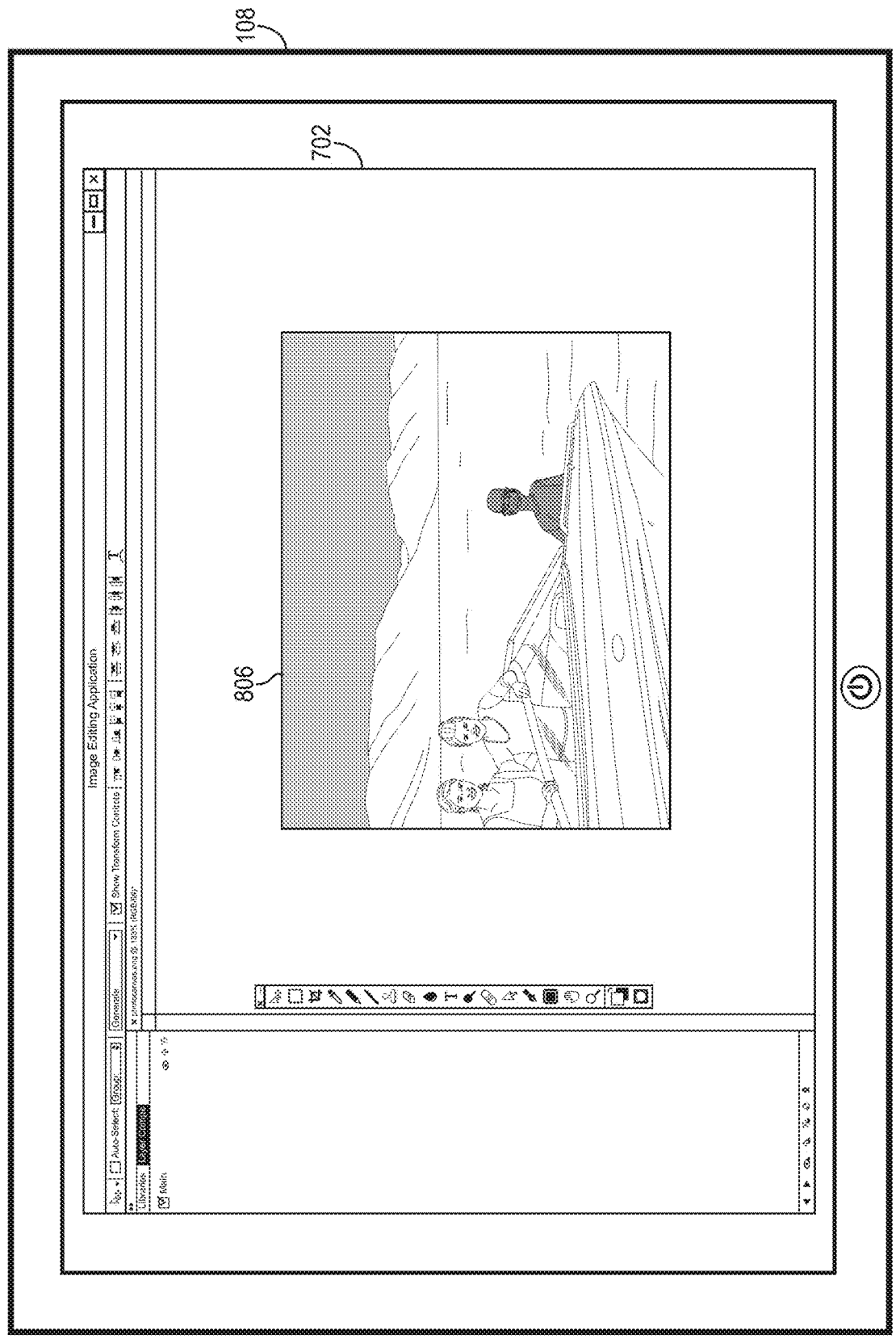

Continuing to FIG. 8B, the multimodal selection system 102 further generates the modified digital image 806 based on the verbal input and gesture input to delete the middle of the three girls. Indeed, as shown, the multimodal selection system 102 performs one or more functions of a digital image editing application (e.g., the client application 110) to remove the pixels corresponding to the girl and to replace the pixels to match or resemble the surrounding pixels (e.g., via a patch match technique).

Figure 9A:
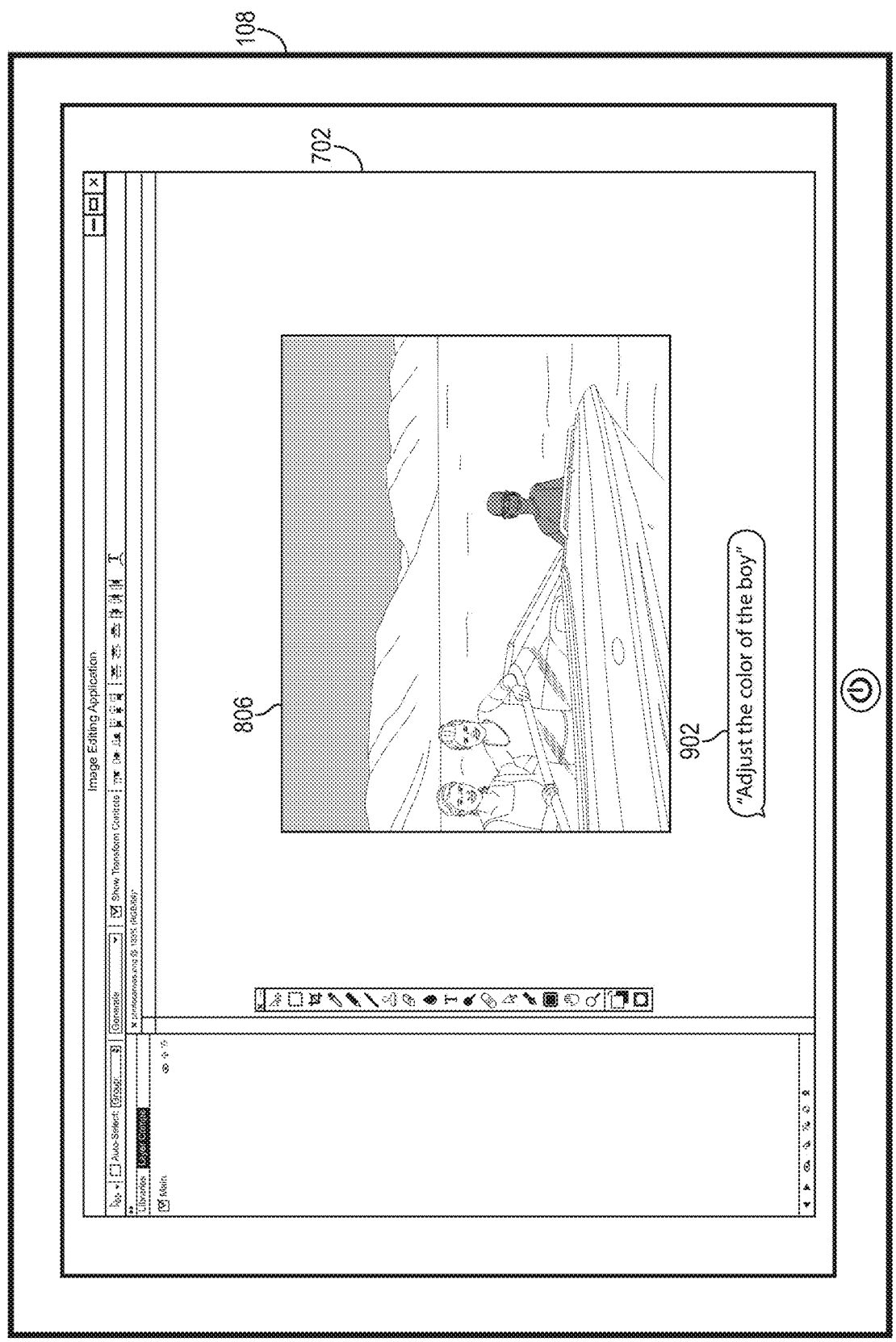

FIG. 9A illustrates the modified digital image 806 together with a verbal input bubble 902 indicated verbal input of "Adjust the color of the boy." Based on the verbal input, the multimodal selection system 102 utilizes the natural language processing neural network 210 as described herein to determine a verbal command. Indeed, the multimodal selection system 102 fills a table associated with the editing action to adjust the color, where some actions include more parameters than others. The editing action associated with the verbal input shown in FIG. 9A (to adjust the color), for example, may require a parameter associated with an object to adjust and a color associated with the adjustment. However, in some cases, the multimodal selection system 102 cannot determine how to perform the received verbal input. The multimodal selection system 102 further generates a confidence score associated with the verbal input to determine whether to move forward with generating a modified image based on the verbal input. However, in this case, the multimodal selection system 102 determines that the verbal input is missing a parameter (i.e., a color value) and therefore generates a confidence score that fails to satisfy a threshold.

Figure 9B:
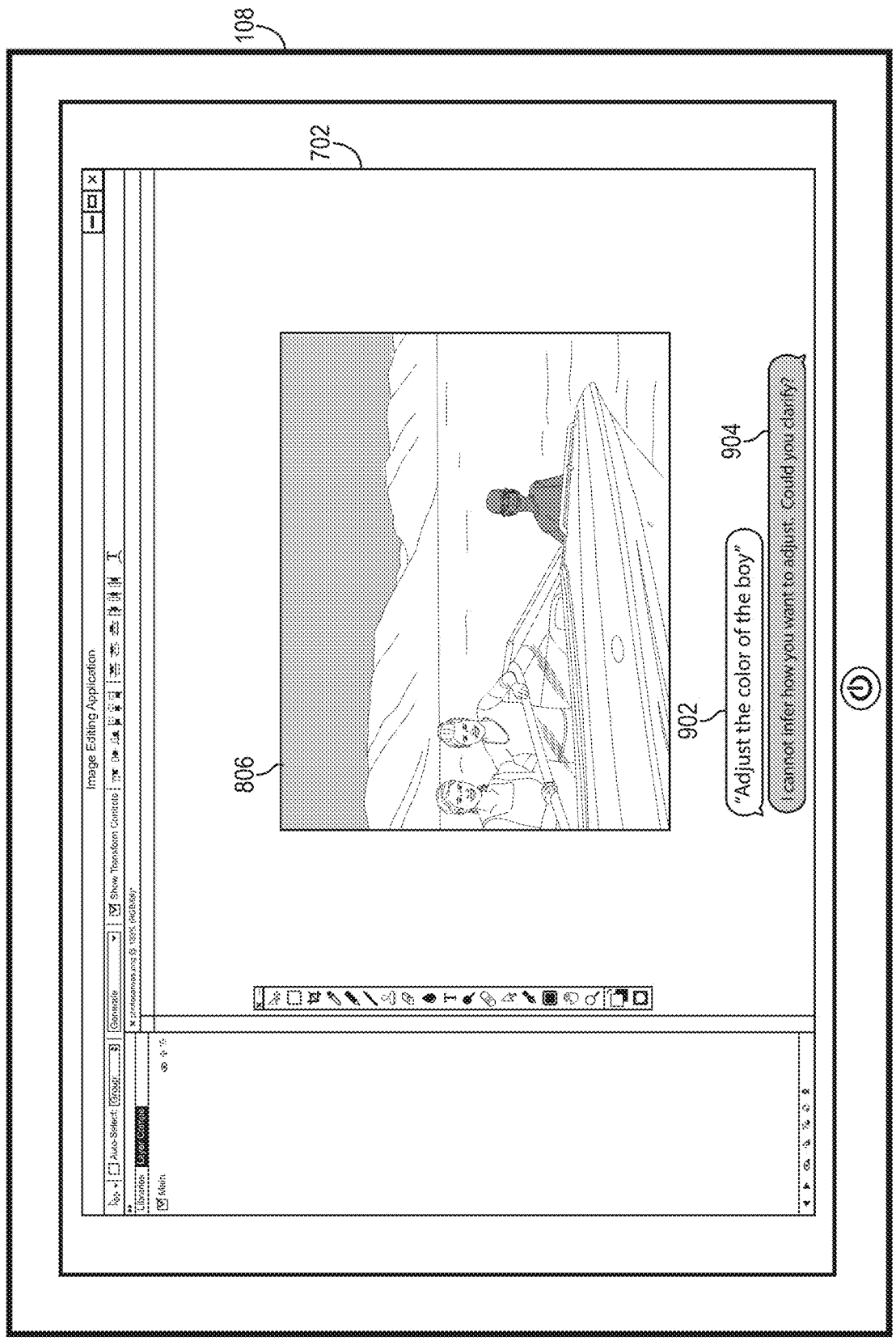

Continuing to FIG. 9B, the multimodal selection system 102 generates and provides a message 904 to request additional information in relation to the digital image 806. As illustrated, the multimodal selection system 102 provides the message 904 that states, "I cannot infer how you want to adjust. Could you clarify?" Thus, as described above, the multimodal selection system 102 provides a message that indicates to the user that additional information is required to supplement or clarify the previously-provided verbal input.

Figure 9C:
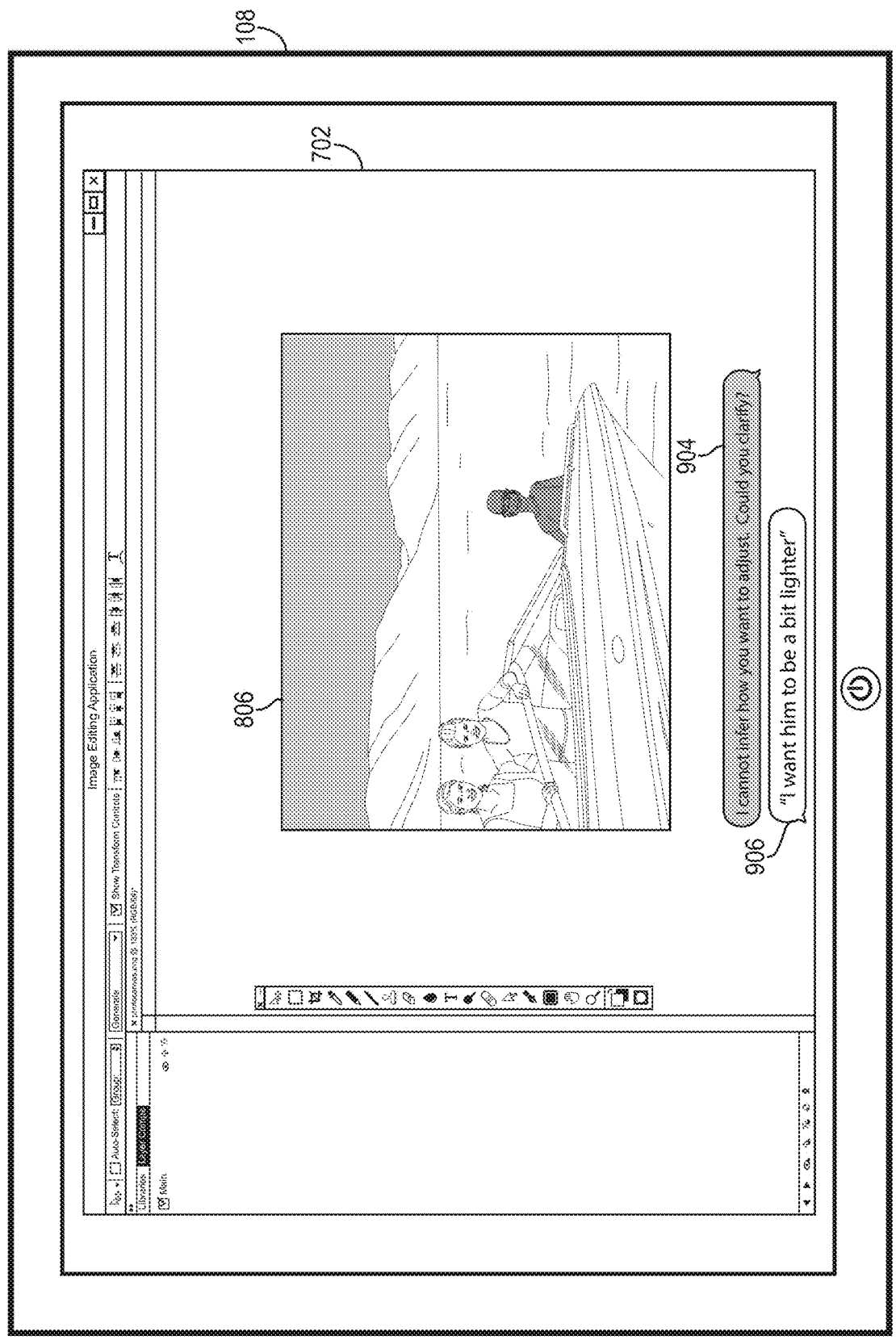

Indeed, FIG. 9C illustrates a verbal input bubble 906 that the multimodal selection system 102 receives from the user in response to providing the message 904. As shown, the multimodal selection system 102 provides the verbal input bubble 906 for display together with the message 904 to appear as though the multimodal selection system 102 is carrying out a conversation with the user. In some embodiments, the multimodal selection system 102 presents the back-and-forth of verbal input and system messages to have the appearance of a text messaging thread. In other embodiments, the multimodal selection system 102 presents messages using a different format or layout.

As illustrated in FIG. 9C, the multimodal selection system 102 receives a verbal input of "I want him to be a bit lighter." Based on this verbal input, the multimodal selection system 102 supplements the verbal input of the verbal input bubble 902 in FIG. 9A to fill out the table corresponding to the verbal command of adjusting the color. More specifically, the multimodal selection system 102 determines the parameters associated with the editing action such as the object to modify (the boy) and information relating to what color changes to apply (a bit lighter). The multimodal selection system 102 further determines a confidence score associated with the verbal command, and upon further determining that the confidence score satisfies a threshold, generates a modified digital image.

Figure 9D:
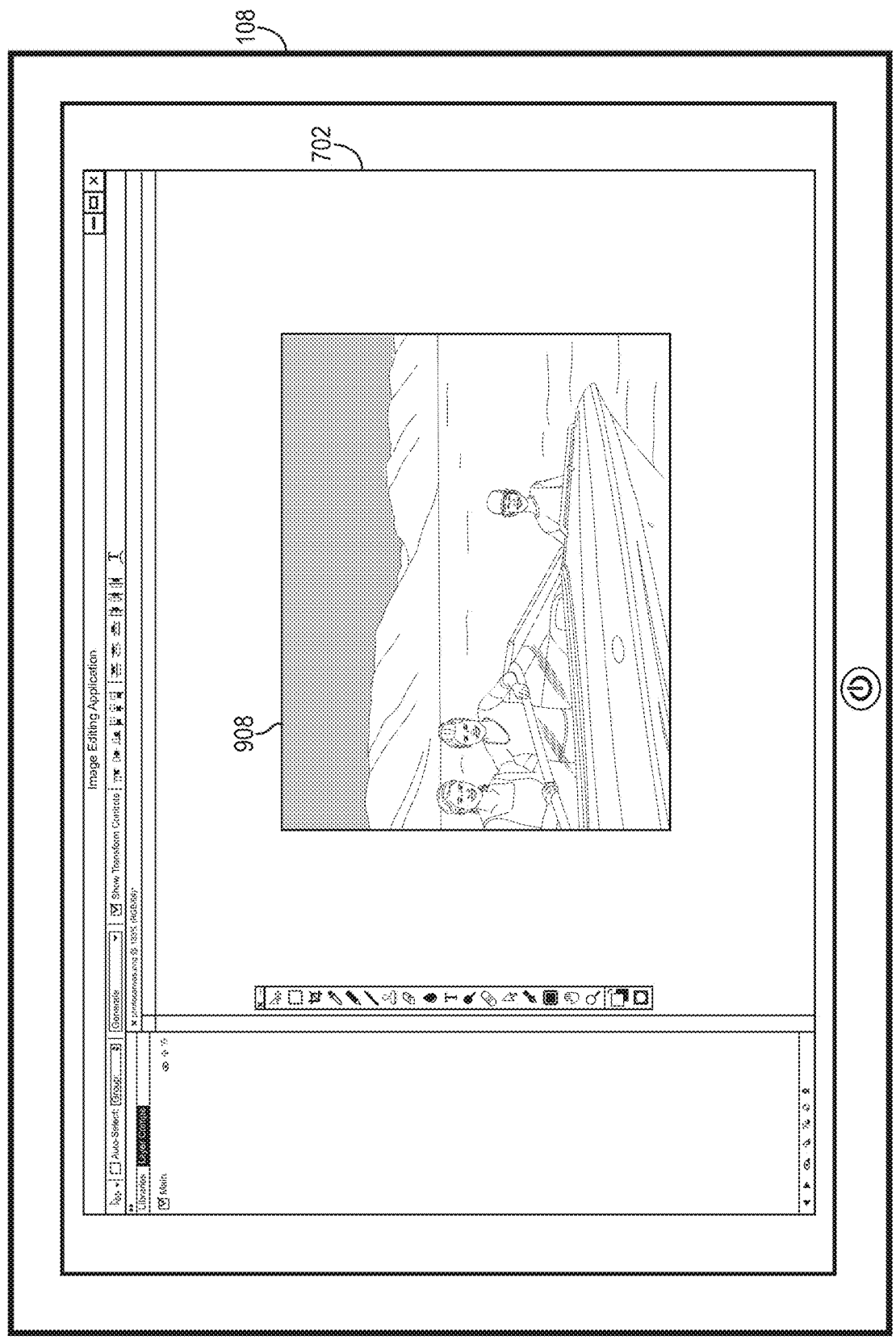

Indeed, FIG. 9D illustrates a modified digital image 908 that the multimodal selection system 102 generates as a result of the preceding verbal commands associated with FIGS. 7A-9C. As shown, the boy within the modified digital image 908 is lighter than in FIG. 9C. Additionally, as described above, the sky has been darkened and the middle girl has been removed according to received verbal input.

As mentioned, the multimodal selection system 102 can operate in a variety of configurations. For example, the multimodal selection system 102 can be distributed across multiple devices (e.g., the client device 108 and the server(s) 104) where some components (e.g., neural networks) are installed on the client device 108 and other components are installed on the server(s) 104. In some embodiments, the multimodal selection system 102 determines which components are to be installed on the client device 108 according to a processing capacity or capability of the client device 108. Indeed, FIG. 10 illustrates an example process for generating a configuration file that instructs the client device 108 to install components of the multimodal selection system 102 according to the processing capacity of the client device 108.

Figure 10:
FIG. 10 illustrates an example process of generating a configuration file in accordance with one or more embodiments.

As illustrated in FIG. 10, the multimodal selection system 102 performs an act 1002 to determine a processing capacity of the client device 108. More specifically, the multimodal selection system 102 performs a system analysis of the client device 108 using a diagnostic benchmark test. Accordingly, the multimodal selection system 102 tests the capabilities of the client device 108 in performing various calculations, graphical manipulations, and/or other processes. In this way, the multimodal selection system 102 ascertains whether the client device 108 is capable of running the natural language processing neural network 210, the dispatcher 212, the salient object neural network 214, the gesture neural network 216, and/or the verbal and gesture neural network 218.

In addition, the multimodal selection system 102 performs an act 1004 to generate a configuration file. In particular, the multimodal selection system 102 generates a configuration file according to the determined processing capacity of the client device 108. In cases where the client device 108 has a lower processing capacity, the multimodal selection system 102 generates a configuration file that instructs the client device 108 to install fewer and/or less processing-intensive components of the multimodal selection system 102.

In some embodiments, the multimodal selection system 102 generates the configuration file based on a geographic location associated with the client device 108. For example, the multimodal selection system 102 determines that the client device 108 is in a location that makes communication with a large number of cloud-based neural networks or other components impractical or slow. For example, the multimodal selection system 102 can determine a download speed, an upload speed, network restrictions, cloud storage capabilities, and/or a proximity to host servers (e.g., the server(s) 104) associated with the client device 108 at a particular location. The multimodal selection system 102 can generate a configuration file based on these determinations. Thus, the multimodal selection system 102 generates a configuration file to instruct the client device 108 to install more components when the communication with the server(s) 104 negatively affects the performance of the multimodal selection system 102 as a whole.

Further, the multimodal selection system 102 performs an act 1006 to configure system components according to the configuration file. To elaborate, the multimodal selection system 102 utilizes the configuration file to instruct the client device 108 to download and/or install those components that are compatible (e.g., capable to operate on) with the client device 108. The multimodal selection system 102 can repeat the acts 1002-1006 for different client devices associated with a user for the most efficient operation of each client device.

Figure 11A:
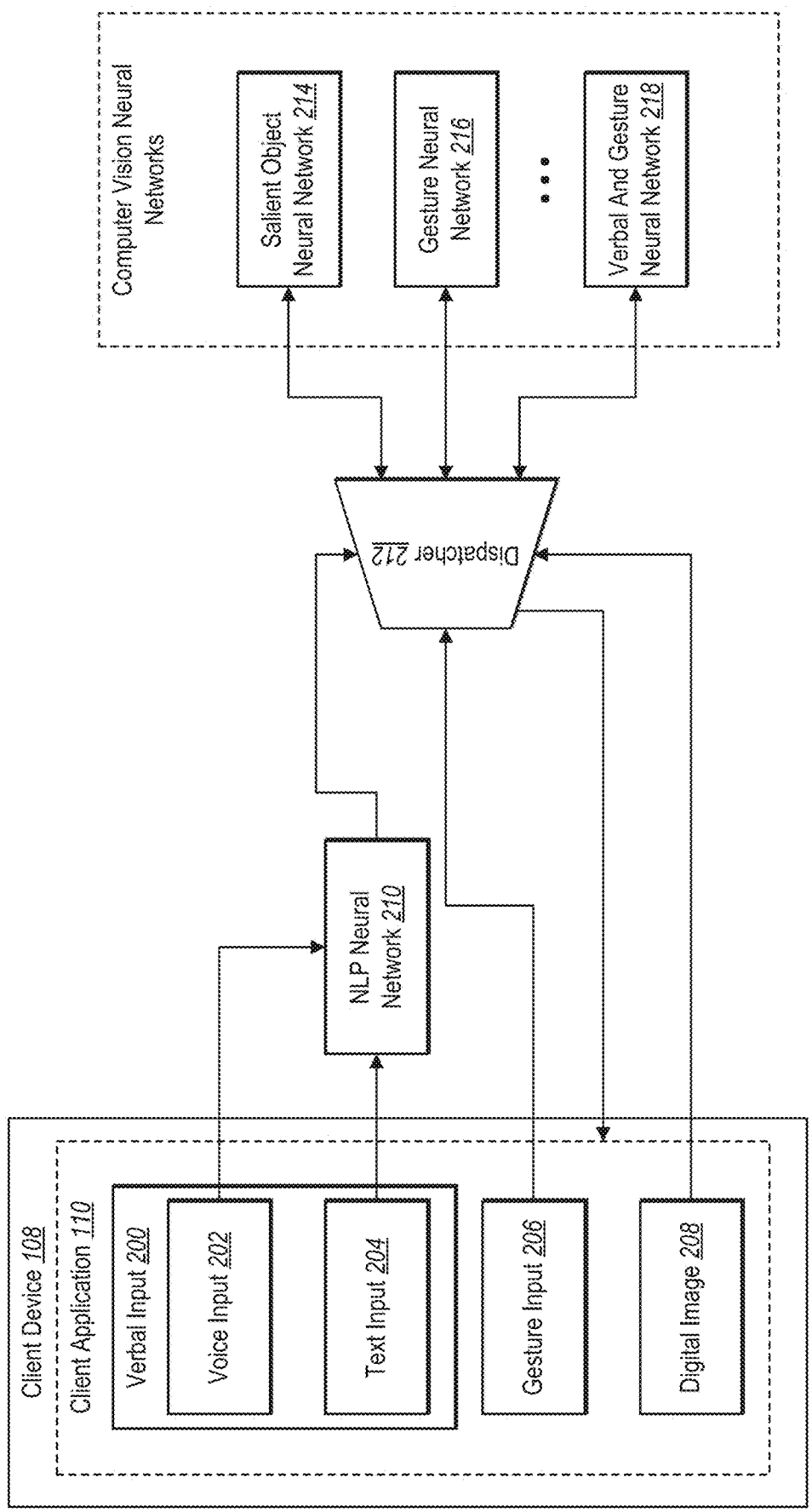
FIGS. 11A-11C illustrate example configurations of the multimodal selection system in accordance with one or more embodiments.
Figure 11B:
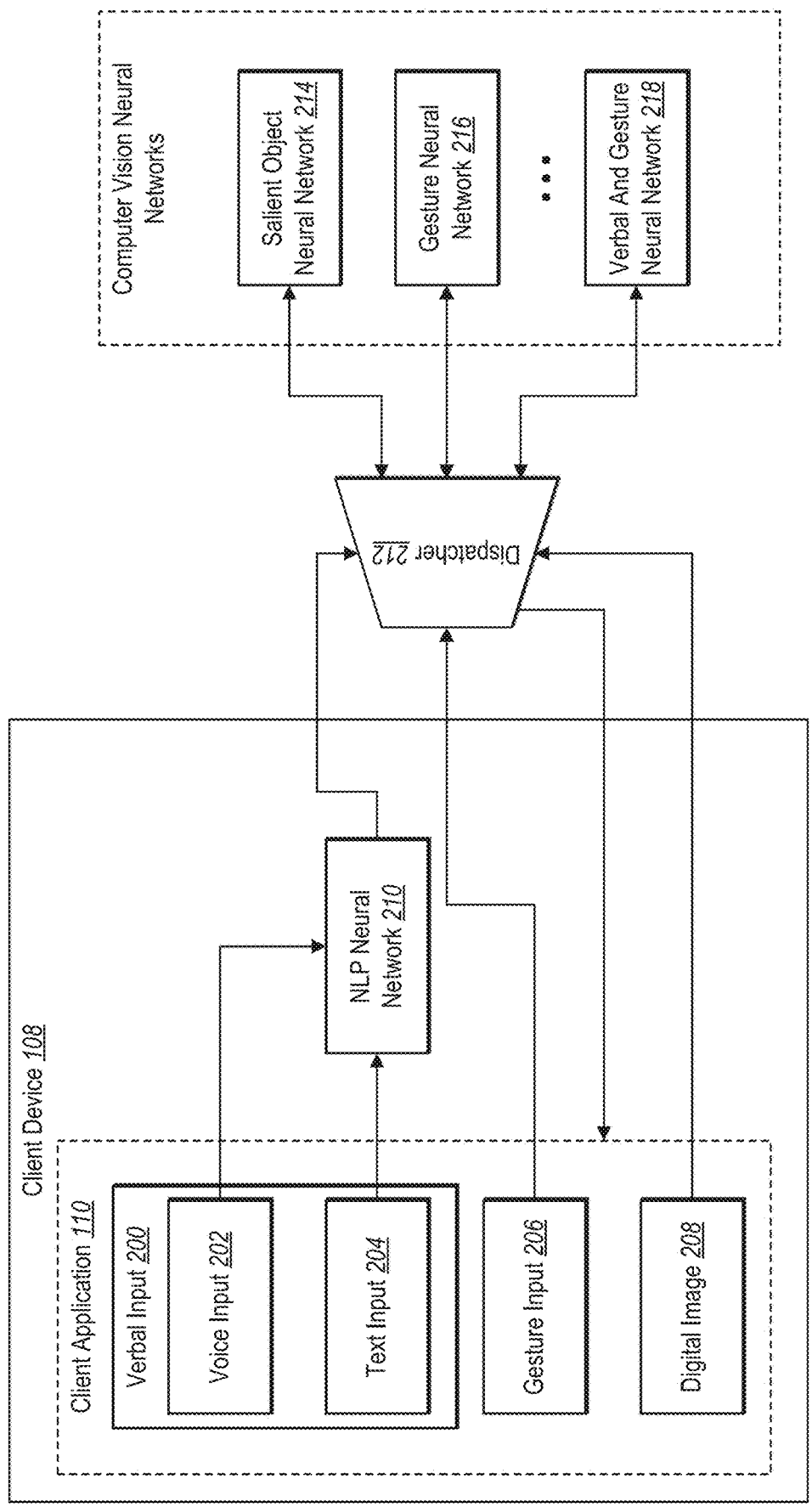
Figure 11C:
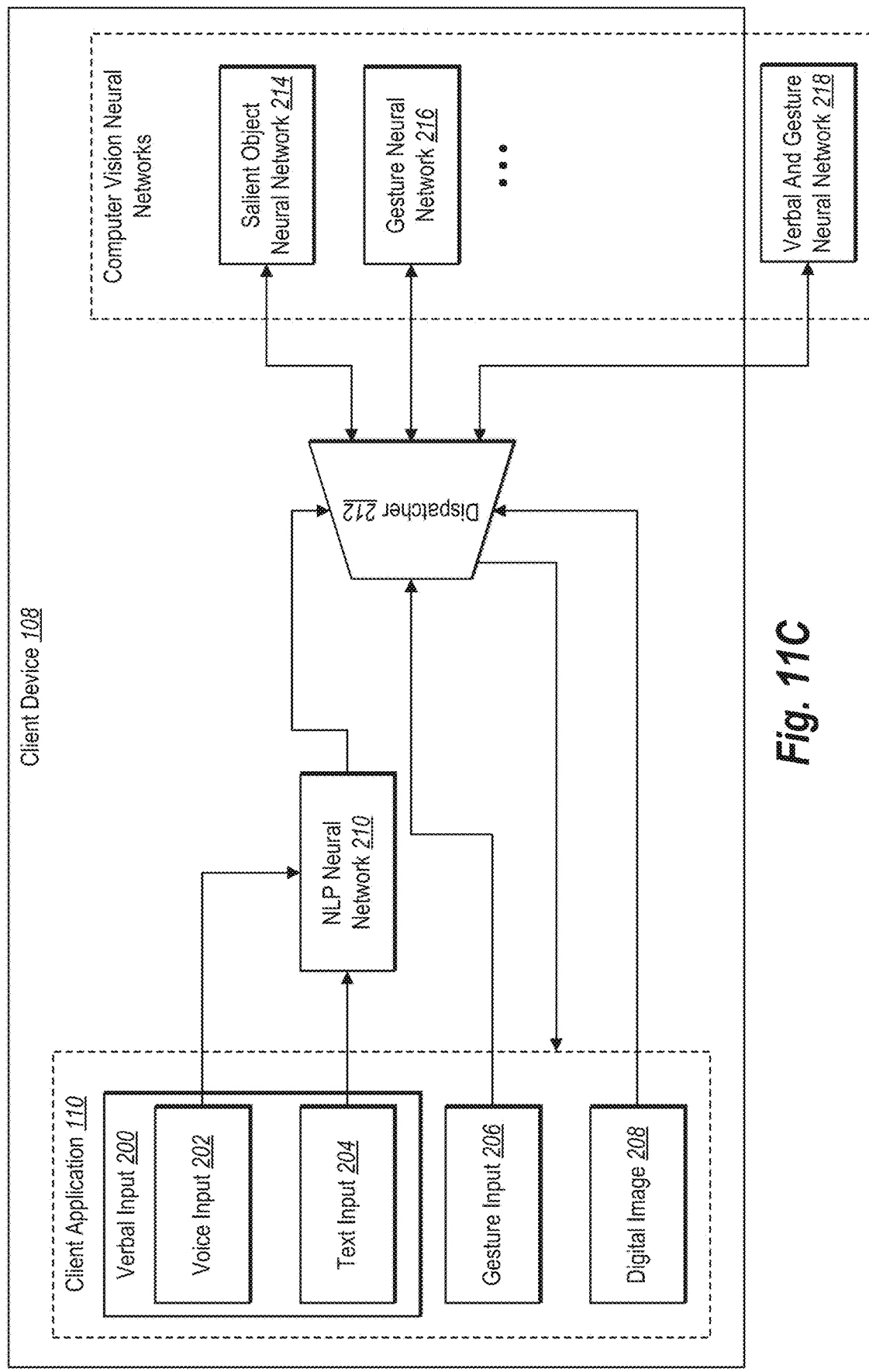

FIGS. 11A-11C illustrate example configurations of the multimodal selection system 102 based on configuration files associated with varying capacities of the client device 108. For example, FIG. 11A illustrates a configuration that the multimodal selection system 102 determines for a low-power device (e.g., a mobile device). In particular, the multimodal selection system 102 determines the processing capacity of the client device 108 and generates a configuration file accordingly. Based on the configuration file, the multimodal selection system 102 determines that the client application 110 is the only component that operates locally on the client device 108 (e.g., the client device 108 performs image capturing and image editing functions, but the remainder of components of the multimodal selection system 102 reside at the server). Thus, the natural language processing neural network 210, the dispatcher 212, and the computer vision neural networks 214-218 are maintained remotely from the client device 108 (e.g., in a cloud-based fashion on the server(s) 104).

Additionally, FIG. 11B illustrates another configuration of the multimodal selection system 102. In particular, the multimodal selection system 102 generates a configuration file for a client device 108 that is higher power than the device of FIG. 11A and that instructs the client device 108 to install the natural language processing neural network 210 onto the client device 108. Indeed, the client device 108 of FIG. 11B may be in a second tier (e.g., the client device 108 satisfies a first processing capacity threshold), while the client device 108 of FIG. 11A may be in a first tier. Thus, because the processing capacity of the client device 108 in the embodiment shown in FIG. 11B is greater, the configuration file instructs the client device 108 to install more components locally. For example, the client device 108 of FIG. 11B includes the natural language processing neural network 108 and the client application 110, while the dispatcher 212 and the computer vision neural networks 214-218 are maintained on the cloud. Thus, to generate a modified digital image in this configuration, the multimodal selection system 102 facilitates communication between cloud-based components such as the computer vision neural networks 214-218 to receive and provide information relative to components local to the client device 108 such as the client application 110.

Further, FIG. 11C illustrates yet another possible configuration of the multimodal selection system 102. Particularly, the client device 108 of FIG. 11C is in a third tier (e.g., satisfies a second processing capacity threshold) and therefore includes even more components than the client device 108 of FIG. 11B. Indeed, the multimodal selection system 102 determines the processing capacity of the client device 108 to be capable of running the natural language processing neural network 210, the dispatcher 212, the salient object neural network 214, and the gesture neural network 216. As shown, the multimodal selection system 102 can facilitate the transfer of information to and from cloud-based components such as the verbal and gesture neural network 218 as well as local components such as the client application 110, the natural language processing neural network 210, and the dispatcher 212. For example, the multimodal selection system 102 can provide the digital image 208, verbal input 200, and gesture input 206 to the verbal and gesture neural network 218 to identify pixels corresponding to an object within the digital image 208. In addition, the multimodal selection system 102 can transmit an object mask of the identified pixels, along with an intention (e.g., as determined via the natural language processing neural network 210) to the client application 110 to perform an editing operation to generate a modified version of the digital image 208.

Although FIGS. 11A-11C illustrate specific configurations of the multimodal selection system 102, additional or alternative configurations are possible. For example, in some embodiments, the multimodal selection system 102 generates a configuration file that instructs the client device 108 to install every component of the multimodal selection system 102. In other embodiments, the multimodal selection system 102 generates a configuration file that instructs the client device 108 to install only the dispatcher 212 along with the client application 110.

In addition, the multimodal selection system 102 is extensible, as described above. In particular, the multimodal selection system 102 can adapt to incorporate different components within its architecture based on any configuration, including those illustrated in FIGS. 11A-11C. For example, the multimodal selection system 102 can replace the natural language processing neural network 210 with a newer neural network. In some embodiments (e.g., such as the configurations of FIGS. 11B and 11C), the multimodal selection system 102 generates a configuration file to instruct the client device 108 to install the new neural network to replace the natural language processing neural network 210. In other embodiments (e.g., like in FIG. 11A), the multimodal selection system 102 replaces the natural language processing neural network 210 with the newer neural network at the server(s) 104. Indeed, the multimodal selection system 102 can replace the natural language processing neural network 210, the dispatcher 212, and/or any of the computer vision neural networks 214-218 either on the client device 108 or on the server(s) 104.

Figure 12:
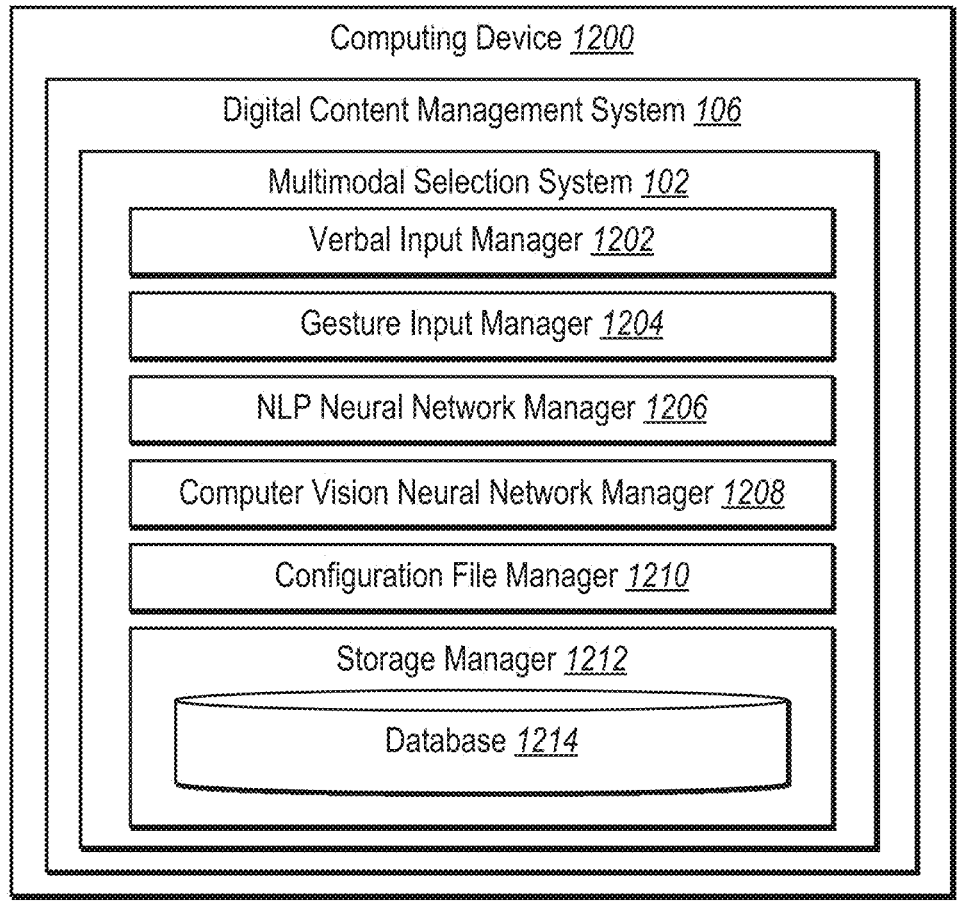
FIG. 12 illustrates a schematic diagram of a multimodal selection system in accordance with one or more embodiments.

Looking now to FIG. 12, additional detail will be provided regarding components and capabilities of the multimodal selection system 102. Specifically, FIG. 12 illustrates an example schematic diagram of the multimodal selection system 102 on an example computing device 1200 (e.g., one or more of the client device 108 and/or the server(s) 104). As shown in FIG. 12, the multimodal selection system 102 may include a verbal input manager 1202, a gesture input manager 1204, a natural language processing neural network manager 1206, a computer vision neural network manager 1208, a configuration file manager 1210, and a storage manager 1212.

As mentioned, the multimodal selection system 102 includes a verbal input manager 1202. In particular, the verbal input manager 1202 manages, receives, detects, and/or identifies verbal input associated with a client device (e.g., the client device 108). In some embodiments, the verbal input manager 1202 receives verbal input in the form of spoken words. In these or other embodiments, the verbal input manager 1202 receives verbal input in the form of typewritten text.

As shown, the multimodal selection system 102 includes a gesture input manager 1204. In particular, the gesture input manager 1204 manages, receives, detects, and/or identifies gesture input associated with a client device. In some embodiments, the gesture input manager 1204 receives gesture input in the form of a touch input, a mouse click, a hand motion, or some other physical or tactile input.

As further shown, the multimodal selection system 102 includes a natural language processing neural network manager 1206. In particular, the natural language processing neural network manager 1206 managers, maintains, trains, utilizes, applies, and/or implements a natural language processing neural network 210 with respect to verbal input. For example, the natural language processing neural network manager 1206 communicates with the verbal input manager 1202 to analyze verbal input to identify verbal commands associated with entities and intentions.

Additionally, the multimodal selection system 102 includes a computer vision neural network manager 1208. In particular, the computer vision neural network manager 1208 managers, maintains, trains, utilizes, applies, and/or implements one or more computer vision neural networks (e.g., computer vision neural networks 214-218). For example, the computer vision neural network manager 1208 communicates with the verbal input manager 1202 and/or the gesture input manager 1204 to select one of the computer vision neural networks 214-218 that corresponds to the received input.

Additionally still, the multimodal selection system 102 includes a configuration file manager 1210. In particular, the configuration file manager 1210 manages, maintains, generates, creates, and/or determines configuration files for client devices. For example, the configuration file manager 1210 analyzes a client device to determine its processing capacity and generates a configuration file based on the processing capacity. As described, the configuration file manager 1210 can generate a new configuration file for a user when the user uses a different client device or when the user travels to a different geographic location.

As illustrated, the multimodal selection system 102 includes a storage manager 1212. In particular, the storage manager 1212 includes a database 1214 and communicates with the verbal input manager 1202 and the gesture input manager 1204 to store input information within the database 1214. In addition, the storage manager 1212 communicates with the natural language processing neural network manager 1206 and the computer vision neural network manager 1208 to store one or more neural networks as well as training data for training the neural networks. Additionally still, the storage manager 1212 communicates with the configuration file manager 1210 to store configuration files within the database 1214.

In one or more embodiments, each of the components of the multimodal selection system 102 are in communication with one another using any suitable communication technologies. Additionally, the components of the multimodal selection system 102 can be in communication with one or more other devices including one or more client devices described above. It will be recognized that although the components of the multimodal selection system 102 are shown to be separate in FIG. 12, any of the subcomponents may be combined into fewer components, such as into a single component, or divided into more components as may serve a particular implementation. Furthermore, although the components of FIG. 12 are described in connection with the multimodal selection system 102, at least some of the components for performing operations in conjunction with the multimodal selection system 102 described herein may be implemented on other devices within the environment.

The components of the multimodal selection system 102 can include software, hardware, or both. For example, the components of the multimodal selection system 102 can include one or more instructions stored on a computer-readable storage medium and executable by processors of one or more computing devices (e.g., the computing device 1200). When executed by the one or more processors, the computer-executable instructions of the multimodal selection system 102 can cause the computing device 1200 to perform the methods described herein. Alternatively, the components of the multimodal selection system 102 can comprise hardware, such as a special purpose processing device to perform a certain function or group of functions. Additionally or alternatively, the components of the multimodal selection system 102 can include a combination of computer-executable instructions and hardware.

Furthermore, the components of the multimodal selection system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the multimodal selection system 102 may be implemented as part of a stand-alone application on a personal computing device or a mobile device. Alternatively or additionally, the components of the multimodal selection system 102 may be implemented in any application that allows creation and delivery of marketing content to users, including, but not limited to, applications in ADOBE CREATIVE CLOUD, such as ADOBE ILLUSTRATOR, ADOBE PHOTOSHOP, and ADOBE INDESIGN. "ADOBE," "ILLUSTRATOR," "PHOTOSHOP," and "INDESIGN" are registered trademarks of Adobe Inc. in the United States and/or other countries.

FIGS. 1-12, the corresponding text, and the examples provide a number of different systems, methods, and non-transitory computer readable media for generating modified digital images based on verbal and gesture input. In addition to the foregoing, embodiments can also be described in terms of flowcharts comprising acts for accomplishing a particular result. For example, FIG. 13 illustrates a flowchart of example sequences of acts in accordance with one or more embodiments.

Figure 13:
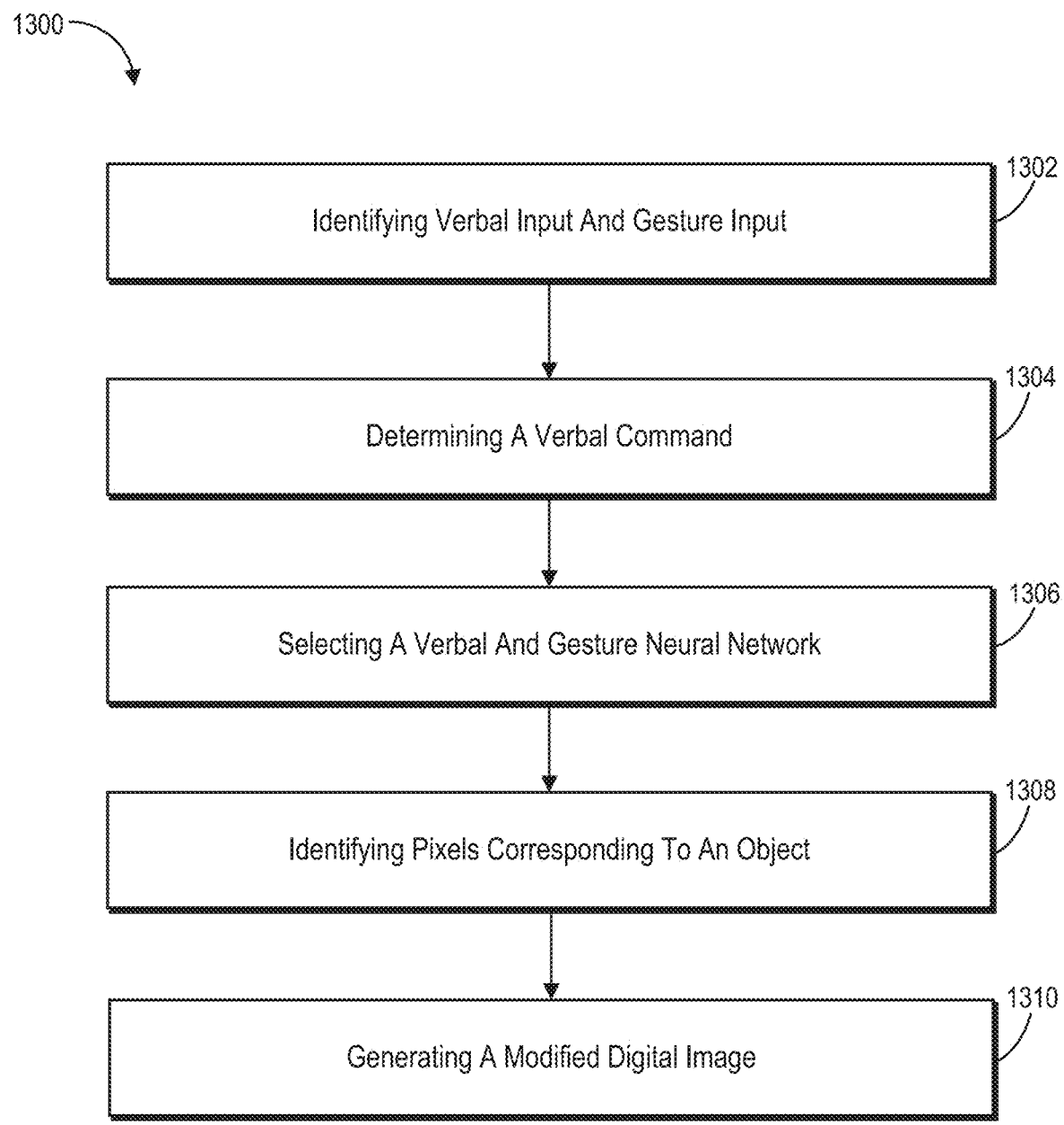
FIG. 13 illustrates a flowchart of a series of acts for generating a modified digital image in accordance with one or more embodiments.

While FIG. 13 illustrates acts according to respective embodiments, alternative embodiments may omit, add to, reorder, and/or modify any of the acts shown in FIG. 13. The acts of FIG. 13 can be performed as part of a method. Alternatively, a non-transitory computer readable medium can comprise instructions, that when executed by one or more processors, cause a computing device to perform the acts of FIGS. 13. In still further embodiments, a system can perform the acts of FIGS. 13. Additionally, the acts described herein may be repeated or performed in parallel with one another or in parallel with different instances of the same or other similar acts.

FIG. 13 illustrates an example series of acts 1300 of generating a modified digital image based on verbal input and gesture input. In particular, the series of acts 1300 includes an act 1302 of identifying verbal input and gesture input. In particular, the act 1302 can involve identifying verbal input and gesture input corresponding to a digital image. The verbal input can include words spoken by a user, and the gesture input can include one or more of a touch input or a mouse input.

The series of acts 1300 can also include an act 1304 of determining a verbal command. In particular, the act 1304 can involve utilizing a natural language processing neural network to determine a verbal command based on the verbal input, wherein the verbal command comprises a verbal object class and a verbal intention. The act 1304 can further involve utilizing a natural language processing neural network to transcribe the verbal input into text, parse the text into a structured format to identify entities within the text, and map the identified entities to object classes corresponding to the verbal and gesture neural network. Mapping the entities can include generating, within an embedding space, vector representations of the identified entities and identifying, based on distances within the embedding space, object class vectors that correspond to the vector representations of the identified entities. In some embodiments, the act 1304 can involve utilizing the natural language processing neural network to determine that the verbal input comprises a coreference term and, in response to determining that the verbal input comprises a coreference term, determine a verbal object class that corresponds to the coreference term.

As shown, the series of acts 1300 can include an act 1306 of selecting a verbal and gesture neural network. In particular, the act 1306 can involve based on identifying the verbal input and the gesture input, selecting a verbal and gesture neural network from a plurality of neural networks. The verbal and gesture neural network can refer to a neural network trained to identify salient objects portrayed in training digital images based on training verbal input, training gesture input, and ground truth salient objects. The plurality of neural networks can include: a salient object neural network trained to determine, without user input, one or more salient objects from a set of training digital images, a gesture neural network trained to determine a plurality of salient objects from a plurality of training digital based on a plurality of training gesture inputs, and the verbal and gesture neural network.

Additionally, the series of acts 1300 can include an act 1308 of identifying pixels corresponding to an object. In particular, the act 1308 can involve applying the verbal and gesture neural network to the verbal object class and the gesture input to identify pixels corresponding to an object portrayed in the digital image that corresponds to the verbal object class.

Further, the series of acts 1300 can include an act 1310 of generating a modified digital image. In particular, the act 1310 can involve utilizing the identified pixels and the verbal intention to generate a modified digital image portraying the object modified according to the verbal intention.

The series of acts 1300 can further include acts of determining a processing capacity of a client device, selecting, based on the processing capacity of the client device, one or more neural networks from the following: the natural language processing neural network and the plurality of neural networks, and generating, based on the processing capacity of the client device, a configuration file corresponding to the selected one or more neural networks. The series of acts 1300 can further include an act of providing, to a client device based on the configuration file, the selected one or more neural networks.

Additionally, the series of acts 1300 can include an act of determining a confidence score associated with the verbal command. The series of acts 1300 can also include an act of, based on determining that the confidence score fails to satisfy a threshold, providing a message requesting additional input corresponding to the digital image.

As mentioned, the multimodal selection system 102 can perform a step for identifying, based on the verbal input and the gesture input, pixels corresponding to an object portrayed in the digital image. Indeed, FIG. 14 illustrates exemplary acts in a step for identifying, based on the verbal input and the gesture input, pixels corresponding to an object portrayed in the digital image.

Figure 14:
FIG. 14 illustrates a series of acts in a step for identifying, based on the verbal input and the gesture input, pixels corresponding to an object portrayed in the digital image.

As shown in FIG. 14, the multimodal selection system 102 performs an act 1402 to determine a verbal command utilizing the natural language processing neural network 210. As described, the multimodal selection system 102 utilizes the natural language processing neural network 210 to determine a verbal command based on the verbal input, wherein the verbal command comprises a verbal object class and a verbal intention. For example, the multimodal selection system 102 utilizes an LSTM network and a CRF network to identify entities and an intention from verbal input, as described above.

Additionally, the multimodal selection system 102 performs an act 1404 to select an applicable computer vision neural network. In some cases, the multimodal selection system 102 selects a salient object neural network 214, while in other cases the multimodal selection system 102 selects a gesture neural network 216 or a verbal and gesture neural network 218 depending on the received verbal and/or gesture input.

As shown, the multimodal selection system 102 also performs an act 1406 to identify pixels corresponding to an object within a digital image. In particular, the multimodal selection system applies the selected computer vision neural network (e.g., the verbal and gesture neural network 218) to the verbal object class and the gesture input to identify pixels corresponding to an object portrayed in the digital image that corresponds to the verbal object class, as described in further detail above.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 15:
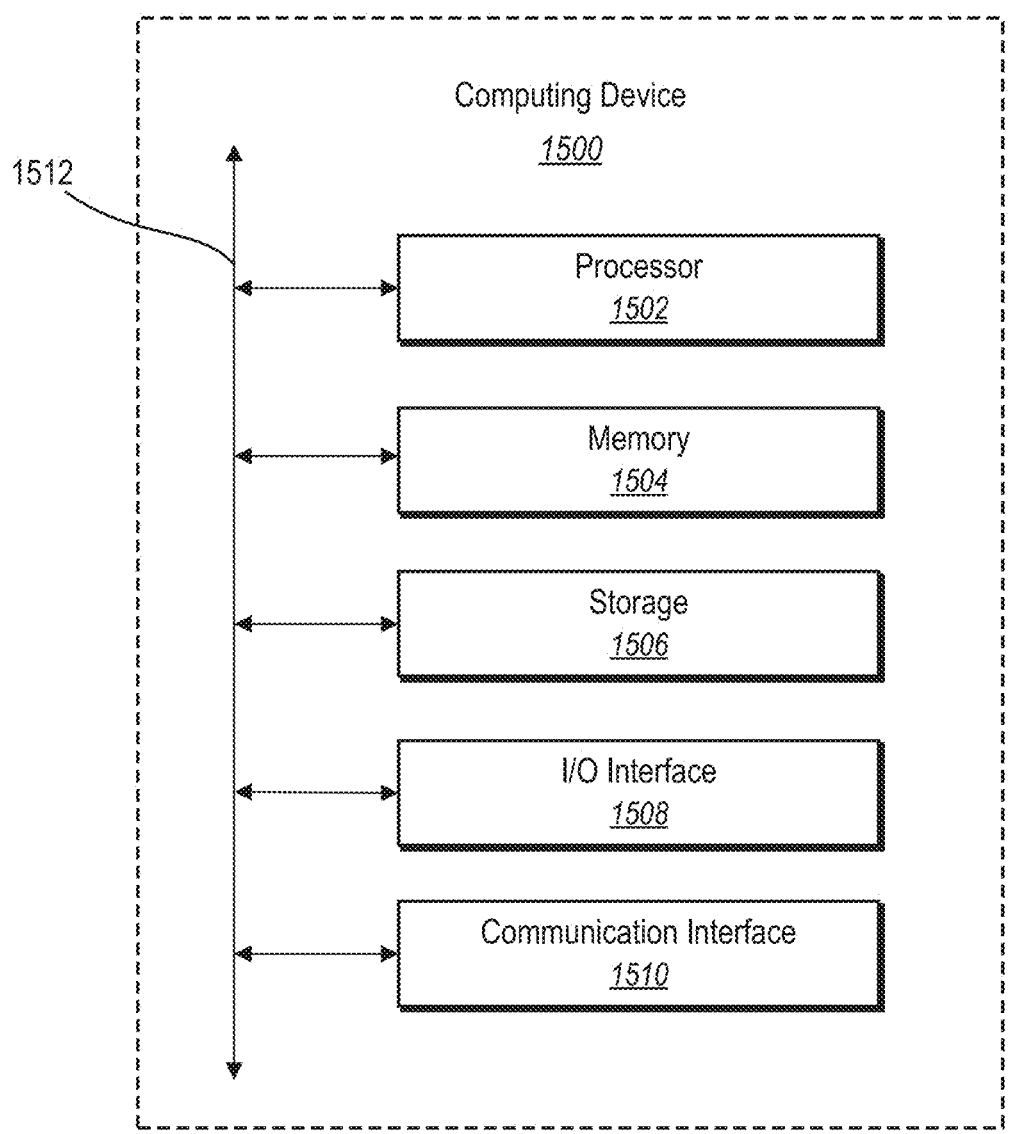
FIG. 15 illustrates a block diagram of an example computing device in accordance with one or more embodiments.

FIG. 15 illustrates, in block diagram form, an example computing device 1500 (e.g., the computing device 1200, the client device 108, and/or the server(s) 104) that may be configured to perform one or more of the processes described above. One will appreciate that the multimodal selection system 102 can comprise implementations of the computing device 1500. As shown by FIG. 15, the computing device can comprise a processor 1502, memory 1504, a storage device 1506, an I/O interface 1508, and a communication interface 1510. Furthermore, the computing device 1500 can include an input device such as a touchscreen, mouse, keyboard, etc. In certain embodiments, the computing device 1500 can include fewer or more components than those shown in FIG. 15. Components of computing device 1500 shown in FIG. 15 will now be described in additional detail.

In particular embodiments, processor(s) 1502 includes hardware for executing instructions, such as those making up a computer program. As an example, and not by way of limitation, to execute instructions, processor(s) 1502 may retrieve (or fetch) the instructions from an internal register, an internal cache, memory 1504, or a storage device 1506 and decode and execute them.

The computing device 1500 includes memory 1504, which is coupled to the processor(s) 1502. The memory 1504 may be used for storing data, metadata, and programs for execution by the processor(s). The memory 1504 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1504 may be internal or distributed memory.

The computing device 1500 includes a storage device 1506 includes storage for storing data or instructions. As an example, and not by way of limitation, storage device 1506 can comprise a non-transitory storage medium described above. The storage device 1506 may include a hard disk drive (HDD), flash memory, a Universal Serial Bus (USB) drive or a combination of these or other storage devices.

The computing device 1500 also includes one or more input or output ("I/O") devices/interfaces 1508, which are provided to allow a user to provide input to (such as user strokes), receive output from, and otherwise transfer data to and from the computing device 1500. These I/O devices/interfaces 1508 may include a mouse, keypad or a keyboard, a touch screen, camera, optical scanner, network interface, modem, other known I/O devices or a combination of such I/O devices/interfaces 1508. The touch screen may be activated with a writing device or a finger.

The I/O devices/interfaces 1508 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1508 is configured to provide graphical data to a display for presentation to a user. The graphical data may be representative of one or more graphical user interfaces and/or any other graphical content as may serve a particular implementation.

The computing device 1500 can further include a communication interface 1510. The communication interface 1510 can include hardware, software, or both. The communication interface 1510 can provide one or more interfaces for communication (such as, for example, packet-based communication) between the computing device and one or more other computing devices 1500 or one or more networks. As an example, and not by way of limitation, communication interface 1510 may include a network interface controller (NIC) or network adapter for communicating with an Ethernet or other wire-based network or a wireless NIC (WNIC) or wireless adapter for communicating with a wireless network, such as a WI-FI. The computing device 1500 can further include a bus 1512. The bus 1512 can comprise hardware, software, or both that couples components of computing device 1500 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A system comprising:
   one or more memory devices comprising a natural language processing neural network, a salient object neural network, a gesture neural network, and a verbal and gesture neural network; and
   one or more server devices configured to cause the system to:
   detect a computer processing capacity of a client device;
   based on the computer processing capacity of the client device, select one or more of, but less than all of, the natural language processing neural network, the salient object neural network, the gesture neural network, or the verbal and gesture neural network to provide to the client device for execution by the client device;
   generate a configuration file based on the selected one or more of, but less than all of the natural language processing neural network, the salient object neural network, the gesture neural network, or the verbal and gesture neural network;
   transmit, to the client device, the selected one or more of, but less than all of, the natural language processing neural network, the salient object neural network, the gesture neural network, or the verbal and gesture neural network based on the configuration file; and
   execute, by the one or more server devices, one or more of the natural language processing neural network, the salient object neural network, the gesture neural network, or the verbal and gesture neural network not transmitted to the client device to perform a cloud-based operation.

2. The system of claim 1, wherein the one or more server devices are configured to cause the system to:
   determine that the client device has a second-tier processing capacity; and
   select and transmit the natural language processing neural network to the client device, wherein the client device utilizes the natural language processing neural network to process verbal input to determine a verbal command comprising a verbal object class and a verbal intention, the verbal command indicating a modification to perform to a digital image.

3. The system as recited in claim 2, wherein the one or more server devices are configured to cause the system to:
   receive an indication of the verbal object class and the verbal intention from the client device;
   utilize the salient object neural network to generate a binary mask that identifies pixels corresponding to an object portrayed in the digital image that corresponds to the verbal object class; and
   transmit the binary mask to the client device to allow the client device to perform the modification to the digital image based on the binary mask.

4. The system as recited in claim 2, wherein the one or more server devices are configured to cause the system to:
   receive a gesture input and an indication of the verbal object class and the verbal intention from the client device;
   process both the verbal object class and the gesture input utilizing the verbal and gesture neural network to identify pixels corresponding to an object portrayed in the digital image that corresponds to the verbal object class;
   utilize the verbal and gesture neural network to process the verbal object class and the gesture input to generate a binary mask that identifies pixels corresponding to an object portrayed in the digital image that corresponds to the verbal object class and the gesture input; and
   transmit the binary mask to the client device to allow the client device to perform the modification to the digital image based on the binary mask.

5. The system as recited in claim 2, wherein the one or more server devices are configured to cause the system to:
   determine that the client device has an updated processing capacity;
   generate an updated configuration file based on the updated processing capacity of the client device; and transmit one or more of the salient object neural network, the gesture neural network, or the verbal and gesture neural network to the client device based on the updated configuration file.

6. The system as recited in claim 1, wherein the one or more server devices are configured to cause the system to:
   determine that the client device has a third-tier processing capacity; and
   select and transmit the natural language processing neural network, salient object neural network, and the gesture neural network to the client device, wherein the client device:
      utilizes the natural language processing neural network to process verbal input to determine a verbal command comprising a verbal object class and a verbal intention, the verbal command indicating a modification to perform to a digital image;
      utilizes the salient object neural network to generate a binary mask that identifies pixels corresponding to an object portrayed in the digital image that corresponds to the verbal object class; and
      performs the modification to the digital image based on the binary mask.

7. The system as recited in claim 6, wherein the one or more server devices are configured to cause the system to:
   determine a confidence score associated with the verbal input;
   determine that the confidence score fails to satisfy a threshold; and
   provide a message to the client device requesting additional input corresponding to the digital image.

8. The system as recited in claim 1, wherein the one or more server devices are configured to cause the system to:
   detect an additional computer processing capacity of an additional client device;
   based on the additional computer processing capacity of the additional client device, determine that the additional client device lacks processing capacity for executing the natural language processing neural network, the salient object neural network, the gesture neural network, or the verbal and gesture neural network; and
   generate an additional configuration file based on the additional computer processing capacity of the additional client device.

9. The system as recited in claim 1, wherein the one or more server devices are configured to cause the system to provide an output of the cloud-based operation to the client device to facilitate performance of a local operation via execution by the client device of at least one of the one or more of the natural language processing neural network, the salient object neural network, the gesture neural network, or the verbal and gesture neural network transmitted to the client device.

10. The system as recited in claim 1, wherein the cloud-based operation is facilitated by an output of a local operation executed by the client device utilizing at least one of the one or more of the natural language processing neural network, the salient object neural network, the gesture neural network, or the verbal and gesture neural network transmitted to the client device.

11. A non-transitory computer-readable medium storing executable instructions, which when executed by at least one processor, cause the at least one processor to perform operations comprising:
   detecting a computer processing capacity of a client device;
   selecting, based on the computer processing capacity of the client device, one or more of, but less than all of, a natural language processing neural network, a salient object neural network, a gesture neural network, or a verbal and gesture neural network to provide to the client device for execution by the client device;
   generating a configuration file based on the selected one or more of, but not all of, the natural language processing neural network, the salient object neural network, the gesture neural network, or the verbal and gesture neural network;
   transmitting from one or more server devices to the client device, based on the configuration file, one or more of, but less than all of, the natural language processing neural network, the salient object neural network, the gesture neural network, or the verbal and gesture neural network; and
   executing, by the one or more server devices, one or more of the natural language processing neural network, the salient object neural network, the gesture neural network, or the verbal and gesture neural network not transmitted to the client device to perform a cloud-based operation.

12. The non-transitory computer-readable medium as recited in claim 11, wherein the operations further comprise:
   determining that the client device has an updated processing capacity;
   generating an updated configuration file based on the updated processing capacity of the client device; and
   transmitting one or more of the salient object neural network, the gesture neural network, or the verbal and gesture neural network to the client device based on the updated configuration file.

13. The non-transitory computer-readable medium as recited in claim 11, wherein the operations further comprise:
   detecting an additional computer processing capacity of an additional client device;
   determining, based on the additional computer processing capacity of the additional client device, that the additional client device lacks processing capacity for executing the natural language processing neural network, the salient object neural network, the gesture neural network, or the verbal and gesture neural network; and
   generating an additional configuration file based on the additional computer processing capacity of the client device.

14. The non-transitory computer-readable medium as recited in claim 11, wherein the operations further comprise providing, by the one or more server devices, an output of the cloud-based operation to the client device to facilitate performance of a local operation via execution by the client device of at least one of the one or more of the natural language processing neural network, the salient object neural network, the gesture neural network, or the verbal and gesture neural network transmitted to the client device.

15. The non-transitory computer-readable medium as recited in claim 11, wherein the operations further comprise facilitating the cloud-based operation by an output of a local operation executed by the client device utilizing at least one of the one or more of the natural language processing neural network, the salient object neural network, the gesture neural network, or the verbal and gesture neural network transmitted to the client device.

16. A computer-implemented method comprising:
   detecting a computer processing capacity of a client device;

selecting, based on the computer processing capacity of the client device, one or more of, but less than all of, a natural language processing neural network, a salient object neural network, a gesture neural network, or a verbal and gesture neural network to provide to the client device for execution by the client device;

generating a configuration file based on the selected one or more of, but not all of, the natural language processing neural network, the salient object neural network, the gesture neural network, or the verbal and gesture neural network;

transmitting from one or more server devices to the client device, based on the configuration file, one or more of, but less than all of, the natural language processing neural network, the salient object neural network, the gesture neural network, or the verbal and gesture neural network; and executing, by the one or more server devices, one or more of the natural language processing neural network, the salient object neural network, the gesture neural network, or the verbal and gesture neural network not transmitted to the client device to perform a cloud-based operation.

17. The computer-implemented method as recited in claim 16, further comprising:

determining that the client device has a second-tier processing capacity; and selecting and transmitting the natural language processing neural network to the client device, wherein the client device utilizes the natural language processing neural network to process verbal input to determine a verbal command comprising a verbal object class and a verbal intention, the verbal command indicating a modification to perform to a digital image.

18. The computer-implemented method as recited in claim 17, further comprising:

receiving an indication of the verbal object class and the verbal intention from the client device;

utilizing the salient object neural network to generate a binary mask that identifies pixels corresponding to an object portrayed in the digital image that corresponds to the verbal object class; and transmitting the binary mask to the client device to allow the client device to perform the modification to the digital image based on the binary mask.

19. The computer-implemented method as recited in claim 16, further comprising providing, by the one or more server devices, an output of the cloud-based operation to the client device to facilitate performance of a local operation via execution by the client device of at least one of the one or more of the natural language processing neural network, the salient object neural network, the gesture neural network, or the verbal and gesture neural network transmitted to the client device.

20. The computer-implemented method as recited in claim 16, further comprising facilitating the cloud-based operation by an output of a local operation executed by the client device utilizing at least one of the one or more of the natural language processing neural network, the salient object neural network, the gesture neural network, or the verbal and gesture neural network transmitted to the client device.

* * * * *